(12) United States Patent
Zhang et al.

(10) Patent No.: US 11,798,284 B2
(45) Date of Patent: Oct. 24, 2023

(54) SYSTEM AND METHOD FOR ROUGH HANDLING RECOGNITION IN A DISTRIBUTION CENTER VIA A ROBUST VISUAL SOLUTION

(71) Applicant: Chinabank Payment (Beijing) Technology Co., Ltd., Beijing (CN)

(72) Inventors: Yue Zhang, Mountain View, CA (US); Xinyao Wang, Union City, CA (US); Si Luo, Bothell, WA (US); Liefeng Bo, Sunnyvale, CA (US)

(73) Assignee: CHINABANK PAYMENT (BEIJING) TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 17/459,524

(22) Filed: Aug. 27, 2021

(65) Prior Publication Data

US 2023/0063926 A1    Mar. 2, 2023

(51) Int. Cl.
*G06V 20/52*  (2022.01)
*G06T 7/215*  (2017.01)
(Continued)

(52) U.S. Cl.
CPC ............. *G06V 20/52* (2022.01); *G06T 7/215* (2017.01); *G06T 7/251* (2017.01); *G06V 10/255* (2022.01);
(Continued)

(58) Field of Classification Search
CPC ...... G06V 20/52; G06V 10/255; G06V 40/28; G06V 10/82; G06V 20/46; G06V 10/22;
(Continued)

(56) References Cited

U.S. PATENT DOCUMENTS 11,501,244 B1 * 11/2022 Hill ..................... G06K 7/1413
2020/0399040 A1 * 12/2020 Bahar .................. G01L 5/0052
(Continued)

FOREIGN PATENT DOCUMENTS

CN        113936339 A     1/2022
CN        113989593 A     1/2022

OTHER PUBLICATIONS

Ze et al, ("Video Swin Transformer", 2021, arXiv:2106.13230, pp. 1-12), (Year: 2021).*

(Continued)

*Primary Examiner* — Amara Abdi
(74) *Attorney, Agent, or Firm* — Scully, Scott, Murphy & Presser, P.C.

(57) ABSTRACT

A method and a system for detecting rough handling. The system has a camera and a computing device. The computing device is configured to: receive a video stream captured by the camera; detect persons and packages from video frames of the video stream; construct person and package trajectories based on the detected persons and packages; recognize an action between one person trajectory and one package trajectory, where the action includes the one person picks up, holds, and drops off the one package; and determine existence of a rough handling when, within a predetermined frames after drop-off of the one package, a motion distance of the one package is greater than a threshold distance, and a motion speed of the one package is greater than a threshold speed.

20 Claims, 11 Drawing Sheets

(51) Int. Cl.
  *G06T 7/246* (2017.01)
  *G06V 40/20* (2022.01)
  *G06V 10/20* (2022.01)
(52) U.S. Cl.
  CPC .... *G06V 40/28* (2022.01); *G06T 2207/10016* (2013.01); *G06T 2207/30196* (2013.01); *G06T 2207/30241* (2013.01)
(58) Field of Classification Search
  CPC ........ G06V 20/40; G06V 20/48; G06T 7/215; G06T 7/251; G06T 2207/10016; G06T 2207/30196; G06T 2207/30241; G06T 5/007; G06T 5/30; G06T 7/20; G06T 7/90; G06Q 10/083
  See application file for complete search history.

(56) References Cited

U.S. PATENT DOCUMENTS

| | | | | |
|---|---|---|---|---|
| 2021/0407107 | A1* | 12/2021 | Lee | G06T 7/50 |
| 2022/0083783 | A1* | 3/2022 | Subramanian | G06V 20/58 |
| 2022/0319172 | A1* | 10/2022 | Ramanathan | G06V 20/52 |
| 2022/0351593 | A1* | 11/2022 | Singh | H04N 7/181 |
| 2022/0374526 | A1* | 11/2022 | Pandey | G06V 10/761 |
| 2023/0023259 | A1* | 1/2023 | Moriyama | B65G 1/137 |

OTHER PUBLICATIONS

Sun, X. et al., "VSRNet: End-to-end video segment retrieval with text query", Pattern Recognition, 2021, pp. 1-10, vol. 119.

Liu, Z. et al., "Video Swin Transformer", 2021, arXiv:2106.13230, pp. 1-12.

First Office Action dated Oct. 13, 2022 received in Chinese Patent Application No. CN 202210280734.4.

Xingyi Zhou, Dequan Wang, Philipp Krähenbühl, arXiv:1904.07850, 2019.

Liang-Chieh Chen, Yukun Zhu, George Papandreou, Florian Schroff, and Hartwig Adam, Encoder-Decoder with atrous separable convolution for semantic Image segmentation, arXiv:1802.02611, 2018.

Shaoqing Ren, Kaiming He, Ross Girshick, and Jian Sun, Faster R-CNN: towards real-time object detection with region proposal net-works, arXiv:1506.01497, 2016.

Joao Henriques, Rui Caseiro, Pedro Martins, and Jorge Batista, High-speed tracking with kernelized correlation filters, arXiv:1404.7584, 2014.

Joao Carreira, & Andrew Zisserman, Quo vadis, action recognition? a new model and the kinetics dataset, Proceedings of the IEEE Conference on Computer Vision and Pattern Recognition, 2017, 6299-6308.

* cited by examiner

SYSTEM AND METHOD FOR ROUGH HANDLING RECOGNITION IN A DISTRIBUTION CENTER VIA A ROBUST VISUAL SOLUTION

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to image processing, and more particularly to systems and methods for recognizing rough handling in distribution centers using a robust visual solution.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A distribution center is a warehouse which receives, stores, and redistributes massive goods to other destinations. Most of these centers hire workers to handle incoming and outgoing goods, and the workers often need to unload and handle packages of the goods by hand, especially near pallet wrapping or conveyor belts. Rough handling is a problem that occurs in the distribution centers when the workers handle goods roughly. The workers may throw the packages away to conveyor belts, drop the packages heavily on the ground, or push the packages to hit other goods hardly. Those rough handling actions can cause damage to the goods and incur loss to the distribution centers or package owners. In response, some distribution centers hire staff to monitor handling workers in the center. However, it is difficult for the staff to monitor multiple workers at the same time, and it can cause a huge amount of labor costs for large centers.

Therefore, an unaddressed need exists in the art to address the aforementioned deficiencies and inadequacies.

SUMMARY

In certain aspects, the present disclosure relates to a system for detecting rough handling. The system includes a camera and a computing device. The computing device has a processor and a storage device storing computer executable code. The computer executable code, when executed at the processor, is configured to:

receive a video stream comprising a plurality of video frames captured by the imaging device;

obtain a plurality of person bounding boxes and a plurality of package bounding boxes from the plurality of video frames;

construct a plurality of person trajectories and a plurality of package trajectories based on the obtained person bounding boxes and package bounding boxes;

recognize an action between one of the plurality of person trajectories and one of the plurality of package trajectories, wherein the action comprises corresponding one person in the one of the plurality of person trajectories picks up, holds, and drops off corresponding one package in the one of the plurality of package trajectories; and determine existence of a rough handling when, at a predetermined frame after drop-off of the corresponding one package, a motion distance of the corresponding one package is greater than a threshold distance, and a motion speed of the corresponding one package is greater than a threshold speed.

In certain embodiments, the computer executable code is configured to obtain the plurality of person bounding boxes and the plurality of package bounding boxes by, for each one of the plurality of video frames:

detecting persons from the one of the video frames to obtain the plurality of person bounding boxes;

detecting packages from the one of the video frames to obtain detected package bounding boxes; and deleting stationary package bounding boxes from the detected packages to obtain the plurality of package bounding boxes.

In certain embodiments, the computer executable code is further configured to:

calculate frame difference between the one of the video frames and its previous frame;

define regions of the one of the video frames having high frame difference as foreground regions; and define the detected package bonding boxes having no overlap with the foreground regions as stationary package bounding boxes.

In certain embodiments, the computer executable code is further configured to add an additional package bounding box to the obtained package bounding boxes, and wherein the additional package bounding box locates at one of the foreground regions when the one of the foreground region has no overlap with detected person bounding boxes and detected package bounding boxes.

In certain embodiments, the computer executable code is configured to interpolate a person bounding box in one of the person trajectories when there is a missing position between two positions of the person trajectory, and interpolate a package bounding box in one of the package trajectories when there is a missing position between two positions of the package trajectory.

In certain embodiments, the computer executable code is further configured to obtain person keypoints corresponding to each of the obtained plurality of person bounding boxes by detection.

In certain embodiments, the person keypoints comprises a wrist keypoint, the corresponding one person picks up the corresponding one package when a closest distance between the wrist keypoints and the corresponding one of the package bounding box is less than 10 pixels, the corresponding one person holds the corresponding one package when the closest distance is less than 10 pixels after picks up, and the corresponding one person drops off the corresponding one package when the closest distance equals to or is greater than 10 pixels after holds.

In certain embodiments, the threshold distance is a relative distance comparing to a pixel size $d_{torso}$ of the corresponding one of the person's torso.

In certain embodiments, the corresponding one person picks up the corresponding one package at (t−u)-th frame, holds the corresponding one package from (t−u+1)-th frame to (t−1)-th frame, and drops off the corresponding one package at t-th frame; the motion distance and the motion speed are calculated for each frame from the (t+x)-th frame until the motion distance is greater than the threshold distance and the motion speed is greater than the threshold speed; for (t+y)-th frame, the motion distance is calculated by $d_{qq}/d_{torso}$, the motion speed is calculated by $$\frac{d_{(t-1)\ to\ (t+y)}}{(y+1) \times d_{torso}},$$

$d_{qq}$ is a pixel distance between bounding box center of the corresponding one package in the (t−1)-th frame and the (t+y)-th frame, $d_{(t-1)\ to\ (t+y)}$ is a pixel distance between bounding box center of the corresponding one package in the (t−1)-th frame and the (t+y)-th frame; and the motion distance threshold is 1, the motion speed threshold is 0.1, t, u, x and y are positive integers, x is in a range of 1-4, and x≤y. In certain embodiments, x=2, and the computer executable code is configured to delete the action when y equals to 19 and there is still no rough handling observed.

In certain aspects, the present disclosure relates to a method for detecting rough handing. In certain embodiments, the method includes:

capturing, by an imaging device, a video stream comprising a plurality of video frames;

obtaining, by a computing device, a plurality of person bounding boxes and a plurality of package bounding boxes from the plurality of video frames;

constructing, by the computing device, a plurality of person trajectories and a plurality of package trajectories based on the obtained person bounding boxes and package bounding boxes;

recognizing, by the computing device, an action between one of the plurality of person trajectories and one of the plurality of package trajectories, wherein the action comprises corresponding one person in the one of the plurality of person trajectories picks up, holds, and drops off corresponding one package in the one of the plurality of package trajectories; and determining, by the computing device, existence of a rough handling when, at a predetermined frame after drop-off of the corresponding one package, a motion distance of the corresponding one package is greater than a threshold distance, and a motion speed of the corresponding one package is greater than a threshold speed.

In certain embodiments, the step of obtaining the plurality of person bounding boxes and the plurality of package bounding boxes comprises:

detecting persons from the one of the video frames to obtain the plurality of person bounding boxes;

detecting packages from the one of the video frames to obtain detected package bounding boxes; and deleting stationary package bounding boxes from the detected packages to obtain the plurality of package bounding boxes.

In certain embodiments, the method further includes:

calculating frame difference between the one of the video frames and its previous frame;

defining regions of the one of the video frames having high frame difference as foreground regions; and defining the detected package bonding boxes having no overlap with the foreground regions as stationary package bounding boxes.

In certain embodiments, the method further includes:

adding an additional package bounding box to the obtained package bounding boxes, wherein the additional package bounding box locates at one of the foreground regions when the one of the foreground regions has no overlap with detected person bounding boxes and detected package bounding boxes.

In certain embodiments, the method further includes obtaining person keypoints corresponding to each of the obtained plurality of person bounding boxes.

In certain embodiments, the person keypoints comprises a wrist keypoint, the corresponding one person picks up the corresponding one package when a closest distance between the wrist keypoints and the corresponding one of the package bounding box is less than 10 pixels, the corresponding one person holds the corresponding one package when the closest distance is less than 10 pixels after picks up, and the corresponding one person drops off the corresponding one package when the closest distance equals to or is greater than 10 pixels after holds.

In certain embodiments, the threshold distance is a relative distance comparing to a pixel size $d_{torso}$ of the corresponding one of the person's torso.

In certain embodiments, the corresponding one person picks up the corresponding one package at (t−u)-th frame, holds the corresponding one package from (t−u+1)-th frame to (t−1)-th frame, and drops off the corresponding one package at t-th frame; the motion distance and the motion speed are calculated for each frame from the (t+x)-th frame until the motion distance is greater than the threshold distance and the motion speed is greater than the threshold speed; for (t+y)-th frame, the motion distance is calculated by $d_{qq}/d_{torso}$, the motion speed is calculated by $$\frac{d_{(t-1)\ to\ (t+y)}}{(y+1) \times d_{torso}},$$

$d_{qq}$ is a pixel distance between bounding box center of the corresponding one package in the (t−1)-th frame and the (t+y)-th frame, $d_{(t-1)\ to\ (t+y)}$ is a pixel distance between bounding box center of the corresponding one package in the (t−1)-th frame and the (t+y)-th frame; and the motion distance threshold is 1, the motion speed threshold is 0.1, t, u, x and y are positive integers, x is in a range of 1-4, and x≤y. In certain embodiments, x=2, and the method further includes deleting the action when y equals to 19 and there is still no rough handling observed.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
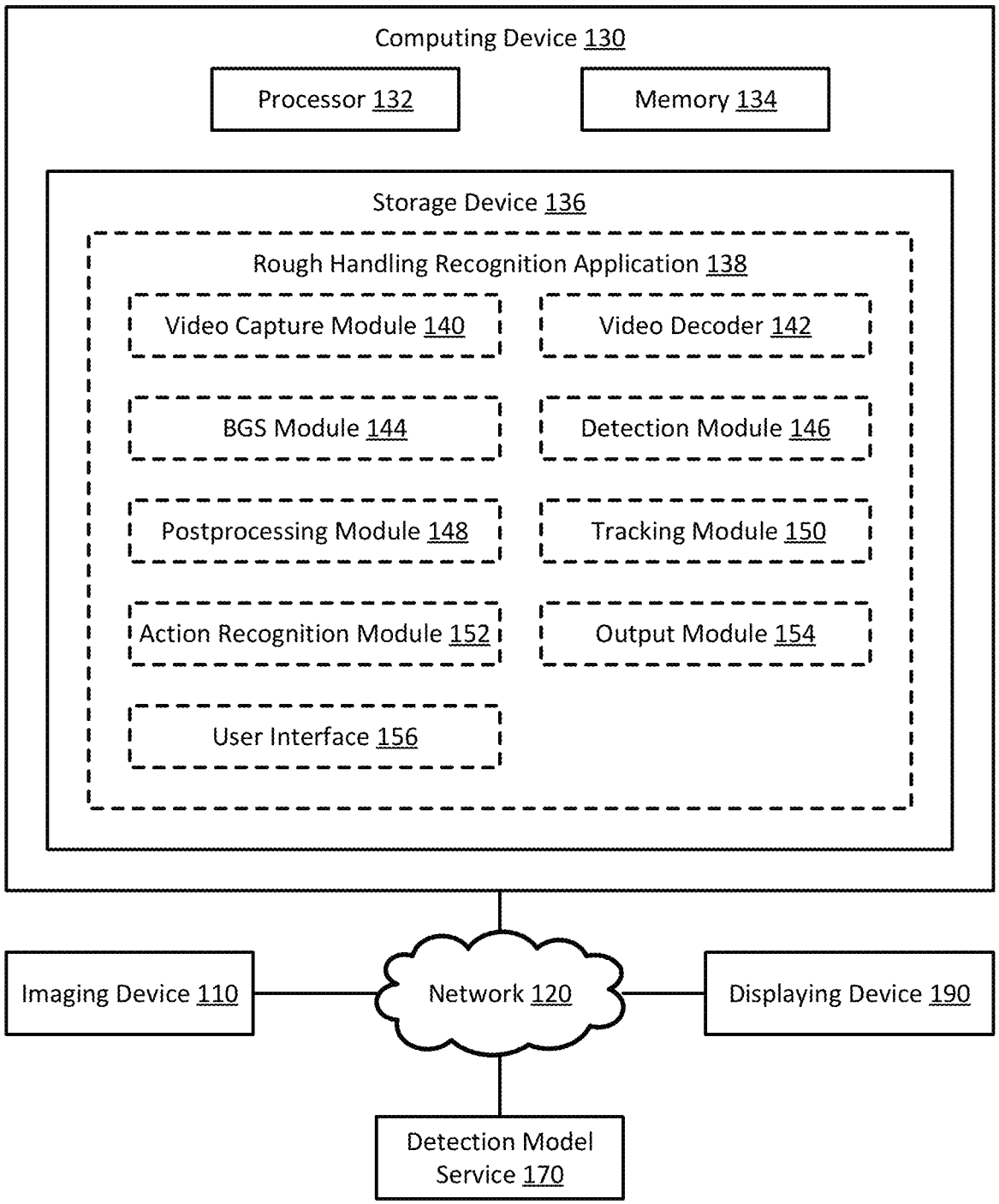
FIG. 1 schematically depicts a rough handling recognition system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "plurality" means two or more. As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure relates to rough handling systems and methods that have function of detecting rough handling of a package by a worker in a distribution center. In certain embodiments, the disclosure provides a robust visual solution and algorithm for intelligent rough handling recognition, which identify rough handling actions in real-time and alarm the distribution center to defer further rough handling actions. For example, if a worker throws a package fast in the air or drops a package heavily on the ground, the system is able to recognize this action, position the worker, locate the area of the action immediately, and then inform the staff in the distribution center to check the package and notify the worker to handle goods more carefully. Notably, the system according to certain embodiments of the disclosure is able to serve on the cloud, on local desktops, or even on lightweight and low cost embedded devices. Meanwhile, the system is robust to serve in various large distribution centers or small distribution rooms. In summary, certain embodiments of the disclosure aim to construct an intelligent and robust rough handling recognition system by detecting, tracking, and understanding actions of workers.

FIG. 1 schematically depicts a rough handling recognition system according to certain embodiments of the present disclosure. As shown in FIG. 1, the system 100 includes an imaging device 110, a computing device 130, a detection model service 170, and a displaying device 190. The imaging device 110, the computing device 130, the detection model service 170, and the displaying device 190 are in communication with each other via a network 120.

In certain embodiments, the imaging device 110 is a red-green-blue (RGB) camera, a grayscale camera, a RGB depth (RGBD) camera, or another type of image capturing device. In certain embodiments, the imaging device 110 is a normal or a wide-angle RGB camera. In certain embodiments, there are multiple imaging devices 110, each of the imaging devices 110 is installed in a surveillance scene, such as a conveyor belt in a package distribution center of an ecommerce platform. One or a few workers work at the conveyor belt, and the field of view of the imaging device 110 covers the workers and the packages on or beside the conveyor belt. The imaging device 110 is configured to capture a video stream at real-time, and send the captured video stream or video frames to rough handling recognition application 138 of the computing device 130. Because the rough handling recognition application 138 can process a large number of video frames in parallel, the number of imaging devices 110 and their covered workers and packages can be great. In certain embodiments, the imaging device 110 is configured to capture video frames in a frame rate of, for example, 30 frames per second (fps), 60 fps, or any other suitable frame rate.

The network 120 may be a wired or wireless network, and may be of various forms. Examples of the networks may include, but is not limited to, a local area network (LAN), a wide area network (WAN) including the Internet, or any other type of networks. In certain embodiments, the network 120 may be an interface such as a system interface, a USB drive, a flash drive, a hard drive, a floppy disk, a SD card, or an optical drive other than a network, or any other types of interfaces to communicatively connect the computing device 130 with the imaging device 110, the detection model service 170, and the displaying device 190. In certain embodiments, the network 120 may include multiple different networks, and each of the networks is used for the communication between two or more of the devices or service 110, 130, 170, and 190.

In certain embodiments, the computing device 130 may be a cloud computer, a server computer, a cluster, or a local general-purpose computer, which manages the rough handling recognition system. In certain embodiments, the computing device 130 is a specialized computer with limited processing, memory and storage capacity, which reduces cost of the system 100 while still has sufficient power to implement the functions of the system 100. In certain embodiments, the computing device 130 is an embedded device. As shown in FIG. 1, the computing device 130 may include, without being limited to, a processor 132, a memory 134, and a storage device 136. In certain embodiments, the computing device 130 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 132 may be a central processing unit (CPU) which is configured to control operation of the computing device 130. The processor 132 can execute an operating system (OS) or other applications of the computing device 130. In some embodiments, the computing device 130 may have more than one CPU as the processor, such as two CPUs, four CPUs, eight CPUs, or any suitable number of CPUs. The memory 134 can be a volatile memory, such as the random-access memory (RAM), for storing the data and information during the operation of the computing device 130. In certain embodiments, the memory 134 may be a volatile memory array. In certain embodiments, the computing device 130 may run on more than one memory 134. The storage device 136 is a non-volatile data storage media for storing the OS (not shown) and other applications of the computing device 130. Examples of the storage device 136 may include non-volatile memory such as flash memory, memory cards, USB drives, hard drives, floppy disks, optical drives, solid-state drive (SSD) or any other types of data storage devices. In certain embodiments, the storage device 136 may be a local storage, a remote storage, or a cloud storage. In certain embodiments, the computing device 130 may have multiple storage devices 136, which may be identical storage devices or different types of storage devices, and the applications of the computing device 130 may be stored in one or more of the storage devices 136 of the computing device 130. In certain embodiments, the computing device 130 is a cloud computer, and the processor 132, the memory 134 and the storage device 136 are shared resources provided over the Internet on-demand. In certain embodiments, the computing device 130 is an embedded system that designed for rough handling recognition, and may contain microprocessor with integrated memory and peripheral interfaces, or contain ordinary microprocessors.

As shown in FIG. 1, the storage device 136 includes a rough handling recognition application 138. The rough handling recognition application 138 is configured to provide rough handling recognition and send warning message to staff managing distribution centers, such that the staff can warn the workers handling the packages roughly. In certain embodiments, the warning is automatically delivered to the workers that have rough handling problem. The rough handling recognition application 138 includes a video capture module 140, a video decoder 142, a background subtraction (BGS) module 144, a detection module 146, a postprocessing module 148, a tracking module 150, an action recognition module 152, an output module 154, and a user interface 156. In certain embodiments, the rough handling recognition application 138 may include other applications or modules necessary for the operation of the rough handling recognition application 318. It should be noted that the modules are each implemented by computer executable codes or instructions, which collectively forms one application. In certain embodiments, each of the modules may further include sub-modules. Alternatively, some of the modules may be combined as one stack. In other embodiments, certain modules may be implemented as a circuit instead of executable code, and the computing device 130 may be implemented by a simple circuit board with other accessory components installed on the circuit board. In certain embodiments, some or all of the modules of the rough handling recognition application 138 may be located at a remote computing device or distributed in a cloud.

The video capture module 140 is configured to, upon initialization of the rough handling recognition application 138, instruct the imaging device 110 to capture a video stream of an area of interest, such as a package or product distribution center, and send the captured video stream to the video decoder 142. In certain embodiments, video frames of the video stream are RGB images. When there are multiple imaging devices 110, each of the imaging devices 110 has a device identification (ID) or camera ID, and each video frame has the camera ID of the imaging device 110 that takes the video frame, timestamp or frame number of the video frame, and the RGB image itself.

The video decoder 142 is configured to, upon receiving the video stream, decode the video stream to video frames, and send each video frame to the BGS module 144 and the detection module 146. In certain embodiments, each video frame is stored in a specific place in the storage device 136, and is assigned with a pointer, and the modules in the rough handling recognition application 138 can use the pointers to operate the video frames. In certain embodiments, when the video frames are analog images, the video decoder 142 is further configured to convert the analog signal of the video frames to digital signal. In certain embodiments, the video frames from each camera have the same camera ID, and are placed in a same queue. The discussion below will use one queued video frames as an example, and the processing of multiple queued video frames captured by multiple imaging devices 110 is substantially the same. In the example, the queued video frames is captured by one imaging device 110, and has T number of frames: 1, . . . , t−1, t, t+1, . . . , T. The t-th frame is the current frame, and T and t are positive integers. Since the function of the rough handling recognition application 138 is performed in parallel, there is no need for the video decoder 142 to send the video frames in sequence to the BGS module 144 and the detection module 146. For example, the video decoder 142 is configured to send the video frames to the BGS module 144 and the detection module 146 whenever the frames are available. Each of the video frames has its corresponding camera ID (or queue ID) and timestamp (or/and frame number), such that the modules can recognize the frames and organize the information of the frames logically.

Figure 2:
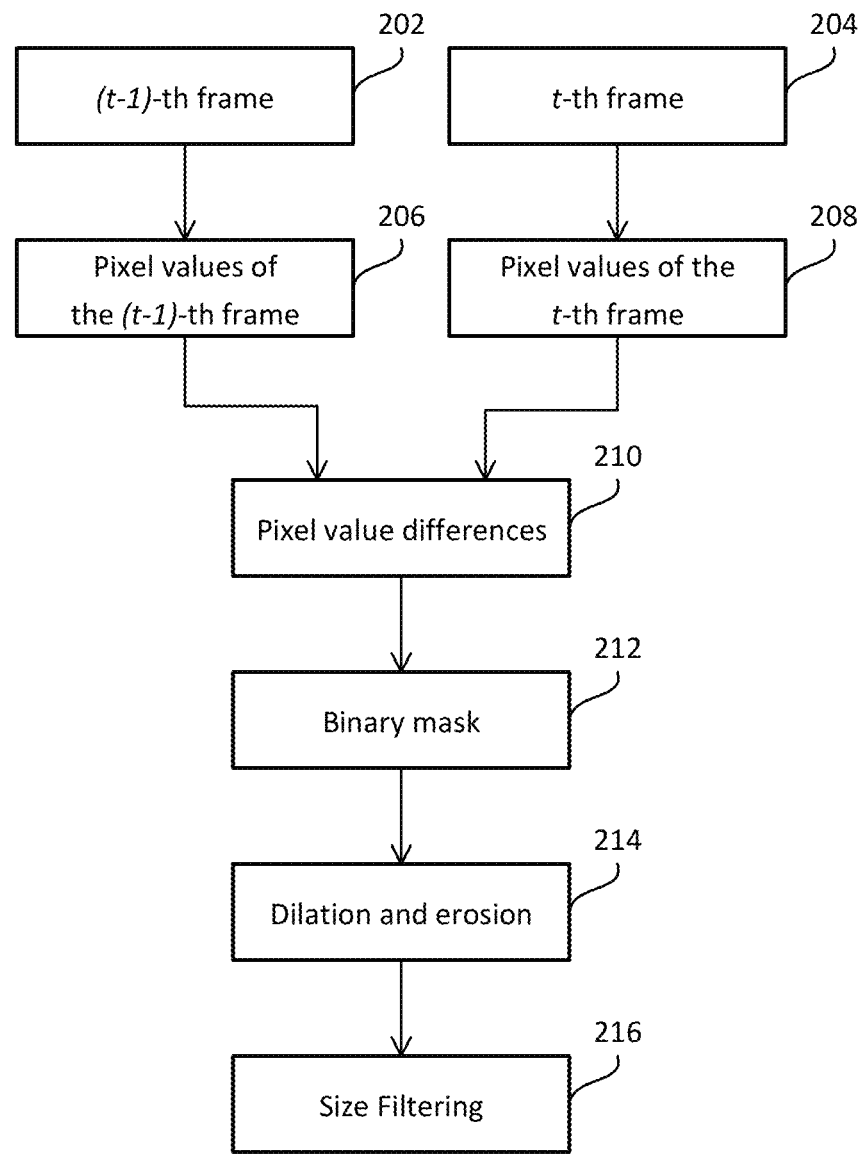
FIG. 2 schematically depicts a conceptual workflow for frame background subtraction according to certain embodiments of the present disclosure.

The BGS module 144 is configured to, upon receiving a current frame from the video decoder 142, subtract the previous frame from the current frame to obtain foreground regions of the current frame, and send the foreground regions to the postprocessing module 148. The information in the video frames captured by the imaging device 110 can be complicated, and the rough handling actions happen only on moving packages or motion packages. Therefore, filtering out stationary regions in the frame and only focusing on regions with motions can help speed up the runtime of downstream processes and improve the accuracy of results. In certain embodiments, for simplicity and efficiency, the BGS module 144 is configured to use a frame difference method for foreground calculation. In certain embodiments, motion regions will have a large pixel difference on two consecutive frames, and the goal of the BGS module 144 is to find these regions in the t-th frame. Particularly, the BGS module 144 is configured to calculate the pixel difference between the t-th frame and its previous frame, the (t−1)-th frame, denote the pixel difference as I, and binarize I with a motion threshold to generate a binary mask $I_m$. In certain embodiments, each pixel in the t-th frame and the (t−1)-th frame is converted to a grayscale value in the range of 0-255 before subtraction, and the motion threshold is set in a range of 1-100. In certain embodiments, the motion threshold is set in a range of 10-30. In certain embodiments, the motion threshold is set at 15. In certain embodiments, the pixels having differences the same as or higher than the motion threshold is binarized as 1, and the pixels having differences less than the motion threshold is binarized as 0. That is to say, if the difference (absolute value) between a pixel in the t-th frame and the (t−1)-th frame is greater than 15, it is assigned with the value 1. As a result, the binary mask $I_m$ has a value of either 0 or 1 corresponding to each of the pixels in the t-th frame. In certain embodiments, after generation of the binary mask $I_m$, the BGS module 144 is further configured to apply dilation and then erosion algorithm on the binary mask $I_m$ to remove noises. After dilation and erosion, the binary mask $I_m$ include blubs that have the value of 1. In certain embodiments, the BGS module 144 is further configured to filter the blubs using a predefined size threshold, so as to keep only the blubs that are larger than the predefined size threshold. In an example, the predetermined size threshold is set as 1000 pixels in a 1280×720 or 1920×1080 video frame. The size of the video frame may vary, and in certain embodiments, the video frame may also be a cropped image from the captured full size frames. The filtered blubs are the foreground regions. For example, if by comparing with the (t−1)-th frame, the t-th frame has f foreground regions, the f foreground regions may be denoted as $D^t=\{d_1^t, \ldots, d_f^t\}$, where t indicates the current time or the current frame, and f indicates the number of foreground regions. In certain embodiments, to detect regions with motion (foreground), the BGS module 144 may also use the current frame t and a predetermined number of frames previous to the t-th frame to calculate a reference image, and subtract the reference image from the t-th frame to obtain the foreground regions. In certain embodiments, the BGS subtraction module 144 may use a background subtraction algorithm different than the ones described above. In certain embodiments, the pixel difference can be calculated directly from RGB values of the pixels instead of converting the RGB values to the grayscale values, and the difference threshold may vary accordingly. In certain embodiments, the frame difference is calculated using blocks instead of pixels, and each block may include several adjacent pixels, such as four or nine pixels. Kindly note that when the current frame is the first frame of the video stream, there is no previous frame and accordingly there is no need to calculate the foreground regions. In other words, the BGS module 144 starts its function from the second frame of the video stream. FIG. 2 schematically depicts a flowchart 200 of the function of the BGS module 144. As shown in FIG. 2, the (t−1)-th frame 202 and the t-th RGB frame 204 are provided, and the pixel values 206 and 208 of the pixels in the two frames are calculated, which could be grayscale values converted from the RGB color values. The pixel values of the (t−1)-th frame is subtracted from the pixel values of the t-th frame pixel wise to obtain pixel value differences 210. The absolute value of the pixel value differences 210 are compared with a motion threshold. The pixels having a difference the same as or greater than the motion threshold is assigned with the value 1, and the pixels having a difference less than the motion threshold is assigned with the value 0, so as to generate a binary mask 212. The binary mask 212 is optimized by dilation and erosion 214, so as to obtain filtered binary mask. The filtered binary mask contains blubs, where the pixels in the blubs have binary values of 1. The blubs are then filtered by the size threshold at 216, so as to obtain t-th foreground regions of the t-th frame.

Referring back to FIG. 1, the detection module 146 is configured to, upon receiving the current frame from the video decoder 142, communicate with the detection model service 170 to detect person bounding boxes and keypoints for persons and bounding boxes for packages in the current frame, and send the detected person bounding boxes and keypoints and the package bounding boxes to the postprocessing module 148. In certain embodiments, the detection model service 170 is an independent service that receives the current t-th frame from the detection module 146, detects persons and packages in the t-th frame, and returns the detected persons and packages to the detection module 146. The detection results from the detection module 146 includes both persons and stationary/motion packages. The detection model service 170 may be implemented by, for example a cloud computing device or a server computer. To maximize hardware resource utilization, the detection model service 170 is shared across all camera video streams as a stand-alone service. However, the detection model service 170 can also be a local service included as part of the detection module 146. In certain embodiments, a variety of detection models can be used by the detection model service 170. In certain embodiments, the detection model is a deep learning based detection model. In certain embodiments, the detection model is CenterNet, which provides good performance and high efficiency for the scenarios of the present disclosure. As described above, the detection model service 170 can process multiple frames in parallel after receiving a copy of multiple frames from the detection module 146, and each of the processes is named an inference model instance. When the detection result are sent back from the detection model service 170 to the detection module 146, the information includes the camera IDs and timestamps (frame number) of the corresponding frames such that the detection results can be well organized based on the camera ID and the timestamps. In certain embodiments, the detection includes a person category and a package category. The person detection result includes a bounding box and multiple keypoints for each of the detected persons from the t-th frame. The keypoints may include, for example, head center (keypoints), neck center (1 keypoints), shoulders (2 keypoints), elbows (2 keypoints), writs (2 keypoints), hips (2 keypoints), knees (2 keypoints), and ankles (2 keypoints). The person detection result is represented by $P^t=\{p_1^t, \ldots, p_k^t\}$, where t indicates the current time or the current frame, k is a positive integer indicating the number of persons detected from the current frame, $p_1^t$ is the detection result for the first detected person and includes the bounding box and the keypoints of the first detected person, and $p_k^t$ is the detection result for the k-th detected person and includes the bounding box and the keypoints of the k-th detected person. The bounding box may be defined by any suitable format, such as the center point location (pixel coordinates), the width of the bounding box in pixels, and the height of the bounding box in pixels. The package detection result only includes a bounding box for each of the detected packages from the t-th frame. The package detection result is represented by $Q^t=\{q_1^t, \ldots, q_l^t\}$, where t indicates the current time or the current frame, l is a positive integer indicating the number of packages detected from the current frame, $q_1^t$ is the detection result for the first detected package and includes the bounding box of the first detected package, and $q_l^t$ is the detection result for the l-th detected package and includes the bounding box of the l-th detected package. The detection model service 170 is configured to provide the two categories of detection—person and package, and to provide bounding box and keypoints for the person category and only bounding box for the package category. The configuration is advantageous by having different detection features for different detection categories. In certain embodiments, the training of the detection model service 170 uses both moving and stationary persons, and both moving and stationary packages, so that the detection model service 170 is able to detect the persons and packages in the video frames more completely. However, some packages, if moving too fast, may blur in certain video frames, and may not be detected by the detection model service 170, which will be dealt by the postprocessing process. In certain embodiments, based on the models the detection model service 170 adopted, the result could also be segmentation masks instead of bounding boxes and keypoints. The detection module 146 is further configured to, upon receiving the detection result from the detection model service 170, organize the results based on the camera IDs and timestamp (frame IDs), and send the organized result to the postprocessing module 148. For example, the detection module 146 may organize the detection result to multiple queues, each queue includes frames for one of the camera IDs. In each queue, the detection module 146 may organize the detection result sequentially based on the timestamp or frame numbers of the frames. In certain embodiments, the detection model service 170 may also be part of the detection module 146.

Figure 3A:
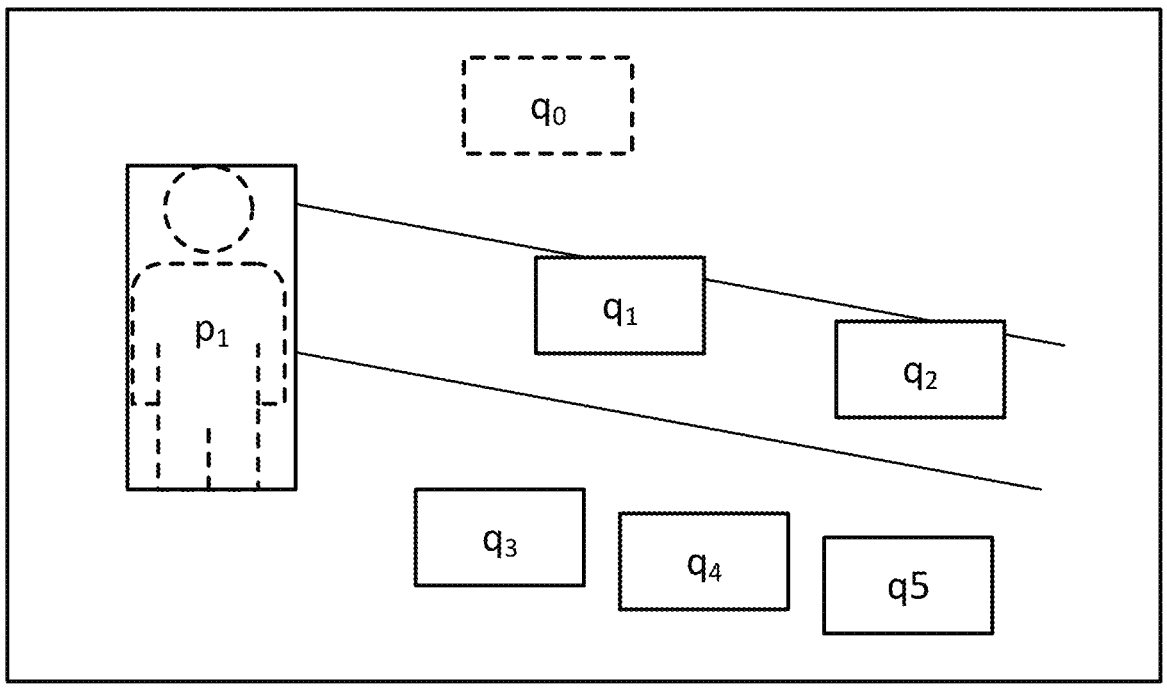
FIG. 3A schematically depicts a person and package detection result of a frame according to certain embodiments of the present disclosure.
Figure 3B:
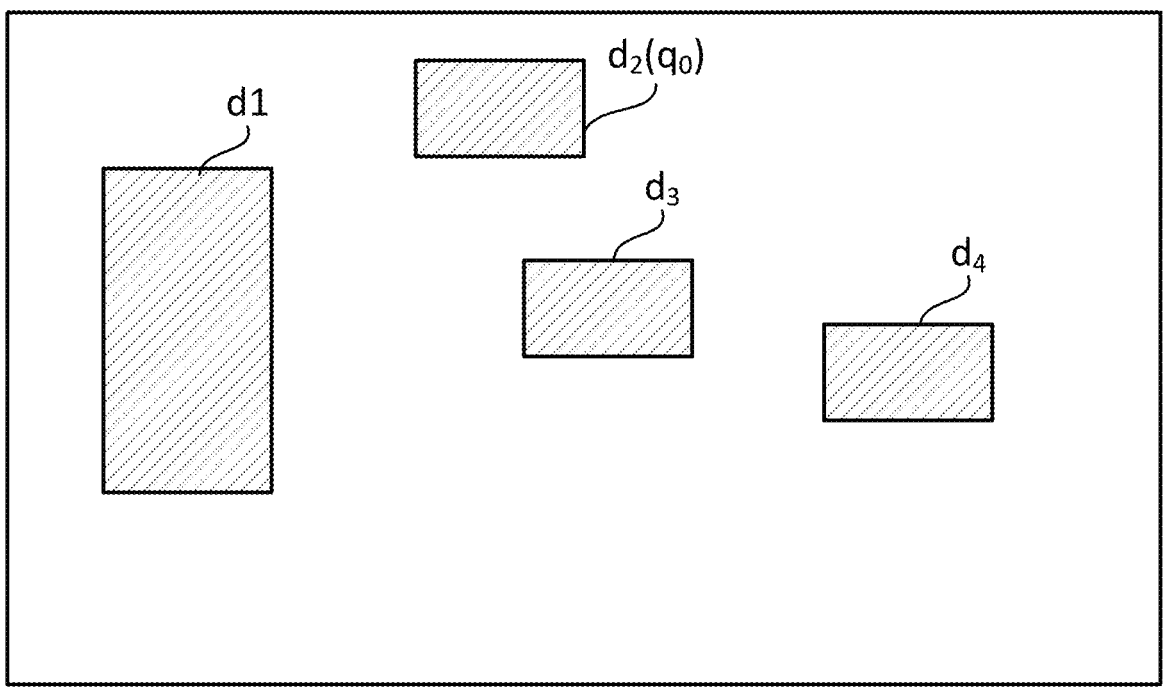
FIG. 3B schematically depicts a background subtraction result corresponding to the frame of FIG. 3A.

The postprocessing module 148 is configured to, upon receiving the foreground regions from the BGS module 144 and the detected person bounding box and keypoints and the detected package bounding box from the detection module 146, remove stationary package bounding boxes from the detected bounding boxes based on the foreground regions and add additional package bounding boxes based on the foreground regions to obtain motion package bounding boxes, and send the detected person bounding box and keypoints and the motion package bounding boxes to the tracking module 150. Kindly note that the detected person bounding box are generally within the foreground regions and there is no need to further process the detected person bounding box and keypoints. For the detected package bounding boxes, the postprocessing module 148 is configured to remove stationary packages in the background of the scene. Specifically, the postprocessing module 148 is configured to calculate the proportion of the package's bounding box that overlaps with any foreground regions. If the proportion equals to or is greater than a predefined overlap threshold, the detected package is regarded as a motion package and is kept, where the overlap threshold may be 0.4. Otherwise, the detected package is deleted. In certain embodiments, the postprocessing module 148 is also configured to filter the person bounding boxes and package bounding boxes based on their sizes. For example, if a blub corresponding to a person bounding box, and the blub is smaller than 40 pixel×60 pixel, the corresponding person bounding box is deleted. If a blub corresponding to a package bounding box, and the blub is smaller than 25 pixel×25 pixel, the corresponding package bounding box is deleted. The size threshold for the person and package bounding boxes may vary depending on the distance between the imaging device 110 and the persons/packages, the resolution of the images, and/or the actual package sizes. The post processing module 148 is further configured to provide additional detection result for fast moving packages that are not captured by the detection model service 170. Since fast-moving packages are very blurry in the frames, it is hard for the detection model service 170 to detect these fast-moving packages. However, the fast-moving packages are distinct in the background subtraction result. Therefore, the post processing module 148 is configured to add these package detections with high speed signal mark, bring these fast moving packages from background subtraction into final detection result to facilitate package tracking. The bounding box deletion and addition are shown in FIG. 3A and FIG. 3B. FIG. 3A schematically depicts a detection result of the current frame by the detection model service 170 (or the detection module 146). As shown in FIG. 3A, the detection result includes a detected human $p_1$, and five detected packages $q_1$, $q_2$, $q_3$, $q_4$, and $q_5$. The dotted box $q_0$ is shown for illustration only, which is a package exist in the current frame but is not detected by the detection model service 170 because it is blurred due to its fast-motion. FIG. 3B schematically depicts the foreground regions generated by the BGS module 144. As shown in FIG. 3B, the foreground regions include blubs $d_1$, $d_2$, $d_3$, and $d_4$. The postprocessing module 148 compares each of the package bounding boxes in FIG. 3A with the blubs in FIG. 3B. When one of the package bounding boxes overlaps with one of the foreground blubs, the package bounding box is kept. Otherwise, the package bounding box is deleted. The overlap is evaluated by an overlap threshold, which is the percentage of the package bounding box within a corresponding blub. In certain embodiments, the overlap threshold is set at 0.2-0.6. In certain embodiments, the threshold is set at 0.3-0.5. In one embodiment, the threshold is set at 0.4. For example, the package bounding boxes $q_1$ and $q_2$ overlap with the foreground blubs $d_3$ and $d_4$ with over 0.4 of the areas of the detected package bounding boxes, and are confirmed as motion packages and are kept. In contrast, the package bounding box $q_3$, $q_4$, and $q_5$ do not overlap with any of the foreground blubs (or the overlap is less than the overlap threshold), and are regarded as stationary packages and deleted. After that, there are still foreground blubs $d_1$ and $d_2$. The blub $d_1$ corresponds to the person bounding box $p_1$, and is set aside. For the foreground blub $d_2$ which has no corresponding bounding box, the postprocessing module 148 is further configured to define a bounding box enclosing the blub $d_2$, and names the newly defined bounding box as a new package bounding box $q_0$. The package bounding box $q_0$ corresponds to the blurred package in the frame. In certain embodiments, the newly added bounding box $q_0$ is labeled with a high speed signal mark because the package moves very fast. After the package bounding box deletion and addition, the postprocessing result includes the person bounding box $p_1$ and person keypoints, and package bounding boxes $q_1$, $q_2$, and $q_0$, and the postprocessing module 148 is further configured to send the postprocessed result to the tracking module 150. The post processed result may be represented by k numb of person bounding boxes and keypoints $P'^t=\{p_1^t, \ldots, p_k^t\}$, and l' number of package bounding boxes $Q'^t=\{q_1^t, \ldots, q_{l'}^t\}$, where l' is the number l minuses the number of deleted stationary package bounding boxes and adds the number of additional package bounding boxes.

The tracking module 150 is configured to, upon receiving the detected person bounding boxes and keypoints and the motion package bounding boxes in the current frame, track the persons and the packages in parallel, and send the updated person trajectories and package trajectories to the action recognition module 152. As described above, there are k number of detected person bounding boxes and l' number of motion package bounding boxes, the current frame is the t-th frame, and the disclosure assumes there are m person tracking trajectories and n package tracking trajectories that are available or active when the t-th frame is to be processed. Each of the m person tracking trajectories tracks locations of a specific person over time and the trajectory includes sequential person bounding boxes and keypoints in multiple sequential frames prior to the t-th frame. The person bounding box and keypoints corresponding to one frame is also named a position in the trajectory. Each of the n package tracking trajectories tracks locations of a specific motion package over time and the trajectory includes sequential package bounding boxes in the multiple sequential frames prior to the t-th frame. The package bounding box corresponding to one frame is also named a position in the trajectory. When the current frame is the first frame in a video, there is no trajectories yet, and there is no foreground calculation. After detection of persons and packages from the first frame, a trajectory is initialized for each detected persons and each detected packages.

At the current t-th frame where t is greater than 1, there are m number of person tracking trajectories and n number of package tracking trajectories, m and n are positive integers (or 0 under certain circumstances), and the updates of the available trajectories are as follows. First, for each of the k number of detected person bounding boxes, the tracking module 150 is configured to compare the detected person bounding box to the person bounding box corresponding to the latest position in each of the person tracking trajectories. In certain embodiments, the matching is performed by computing the Euclidean distances between the center of the detected person bounding box and the center of the bounding box of the latest position of the person tracking trajectory, and using greedy search optimization algorithm to find the best matches based on nearest neighbor measure. In certain embodiments, the best match may also be confirmed by comparing the keypoints of the detected person with the keypoints of the best matched person. When the best matched person bounding box is confirmed, the detected person (his bounding box and keypoints in the current frame) is added to the person tracking trajectory having the matched person. If the matched person bounding box, which is at the latest position of the corresponding person tracking trajectory, is the bounding box detected in the (t−1)-th frame, the person tracking trajectory will add the detected person bounding box and keypoints as the last position of the person tracking trajectory.

When the best matched person bounding box is confirmed, but the matched person bounding box is the bounding box detected in a frame prior to the (t−1)-th frame, the tracking module 150 is configured to interpolate person bounding boxes for the frames between the current frame and the frame having the matched bounding box. The centers of the interpolated person bounding boxes may be evenly distributed points between the center of the corresponding person bounding box in the current frame and the center of the matched bounding box. The respective keypoints of the interpolated person may be evenly distributed points between the corresponding person keypoints in the current frame and the corresponding person keypoints in the matched frame.

If there is no match for the detected person bounding box, the tracking module 150 is configured to initialize a new person tracking trajectory, with the detected person as the starting position of the new person tracking trajectory.

After matching of all the k number of detected person bounding boxes, the tracking module 150 is further configured to check the person tracking trajectories that have no matched detected person bounding box. If the latest position of the person tracking trajectories is the (t−10)-th frame, the person tracking trajectories will be deleted. If the latest position of the person tracking trajectories is between the (t−9)-th frame to the (t−1)-th frame, the person tracking trajectories is kept. Kindly note that the person trajectory deletion threshold 10 here is a predetermined positive integer, which can be any number from, for example, a range of 2-30. In certain embodiments, the present disclosure sets the person trajectory deletion threshold based on the frame rate. For example, the threshold may be about 10 when the frames per second (fps) is 25, and the threshold is about 5 when the fps is 5.

In certain embodiments, the tracking module 150 is configured to deal with the motion package bounding box and the package tracking trajectories the same way, except that the package bounding box has no keypoints.

Figure 4A:
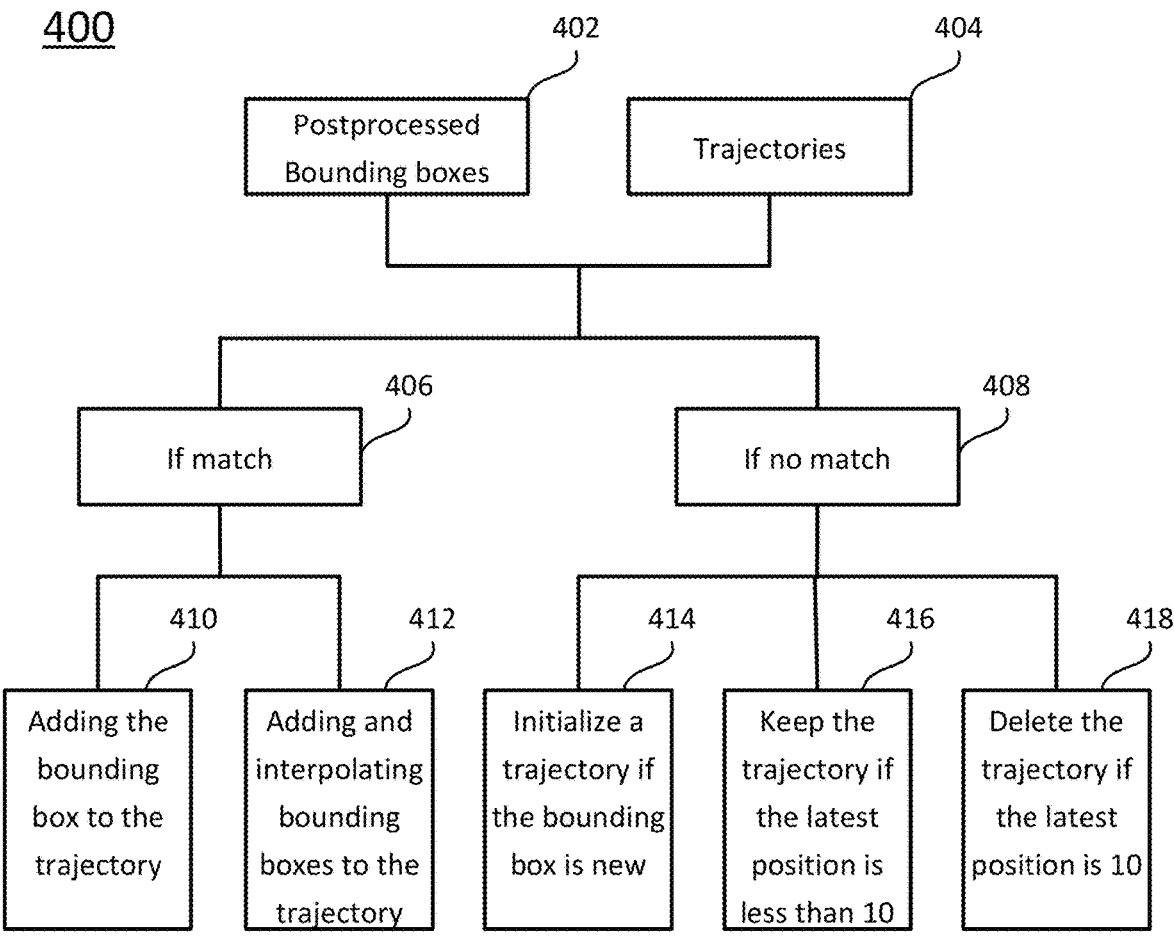
FIG. 4A schematically depicts a conceptual workflow for updating person and package trajectories according to certain embodiments of the present disclosure.

FIG. 4A schematically depicts a flowchart 400 of the function of the tracking module 150. As shown in FIG. 4A, the detected person bounding boxes and motion package bounding boxes 402 of the current frame generated by the postprocessing module 148 are available, and trajectories 404 established by the tracking module 150 in the previous frames are available. The bounding boxes are compared to the latest positions of the trajectories (the person bounding boxes compared to the person tracking trajectories, and the package bounding boxes compared to the package tracking trajectories). If there is a match between a bounding box and the latest position of one trajectory at 406, the bounding box is added as the last position of the trajectory at 410 if there is no frame between the current frame and the latest position frame. If there are one or more frames between the current frame and the latest position frame, at 412, the bounding box is added as the last position of the trajectory, and interpolations are added for each frame between the current frame and frame having the latest position of the trajectory.

If there is no match between a bounding box and any latest position of the trajectories at 408, then at 414, a new trajectory is initialized, with the bounding box as the first position of the initialized trajectory. If there is no match between a trajectory and any of the bounding boxes, and the latest position of the trajectory is less than 10 frames prior to the current frame, at 416, the trajectory is kept as is. If there is no match between a trajectory and any of the bounding boxes, and the latest position of the trajectory is 10 frames (or more) prior to the current frame, the trajectory is discarded.

Figure 4B:
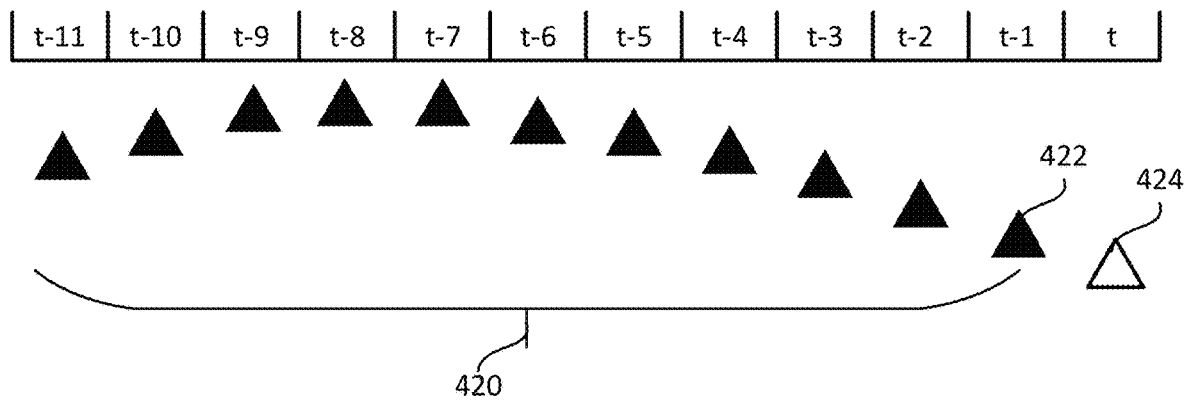
FIG. 4B schematically depicts an update of a trajectory according to certain embodiments of the present disclosure.
Figure 4C:
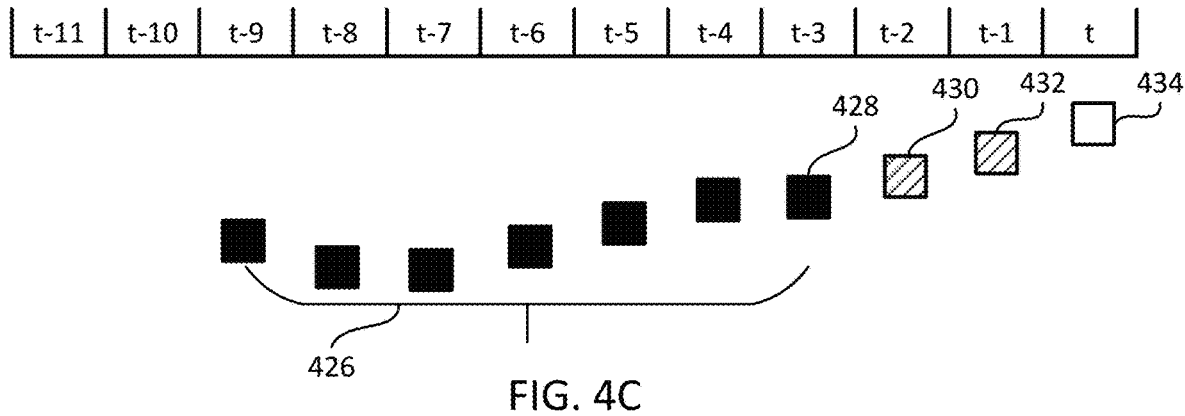
FIG. 4C schematically depicts an update of a trajectory according to certain embodiments of the present disclosure, where interpolation is performed.

FIGS. 4B-4F schematically depicts certain embodiments of updating the trajectories. As shown in FIG. 4B, there is a trajectory 420. The first position of the trajectory 420 is frame t−11, and the latest position of the trajectory 420 is position (bounding box) 422 in the frame t−1. When the postprocessed bounding box (detected person bounding box or motion package bounding box) 424 matches the bounding box at the latest position 422, the postprocessed bounding box 424 is added as the last position of the trajectory 420. As shown in FIG. 4C, there is a trajectory 426. The first position of the trajectory 426 is frame t−9, and the latest position of the trajectory 426 is position (bounding box) 428 in the frame t−3. The postprocessed bounding box 434 matches the bounding box at the latest position 428, the postprocessed bounding box 434 is added as the last position of the trajectory 426, and two positions 430 and 432 are interpolated between the latest position 428 and the postprocessed bounding box 434. In certain embodiments, the positions of 430 and 432 are evenly distributed between the positions 428 and 434. For example, if the center of the position/bounding box 428 is $(x_1, y_1)$, the center of the position/bounding box 434 is $(x_2, y_2)$, then the center of the positions/bounding boxes 430 and 432 are respectively $$\left(\frac{2}{3}x_1 + \frac{1}{3}x_2, \frac{2}{3}y_1 + \frac{1}{3}y_2\right) \text{ and } \left(\frac{1}{3}x_1 + \frac{2}{3}x_2, \frac{1}{3}y_1 + \frac{2}{3}y_2\right).$$

Figure 4D:
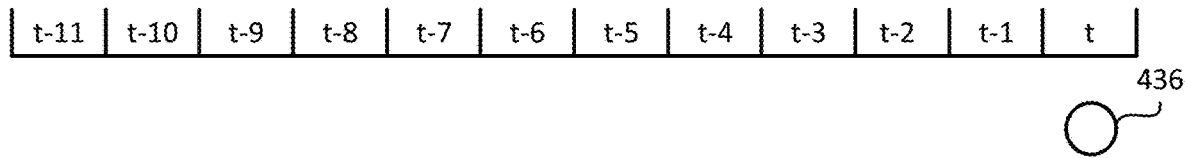
FIG. 4D schematically depicts initialization of a new trajectory according to certain embodiments of the present disclosure.
Figure 4E:
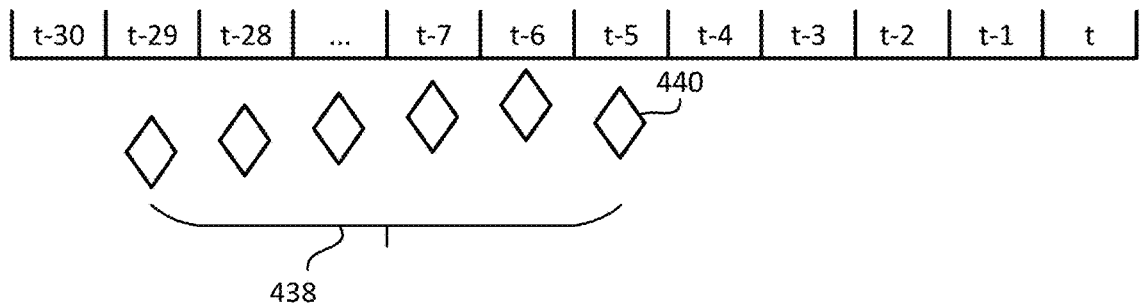
FIG. 4E schematically depicts an update of a trajectory according to certain embodiments of the present disclosure, where the trajectory keeps the same without any change.
Figure 4F:
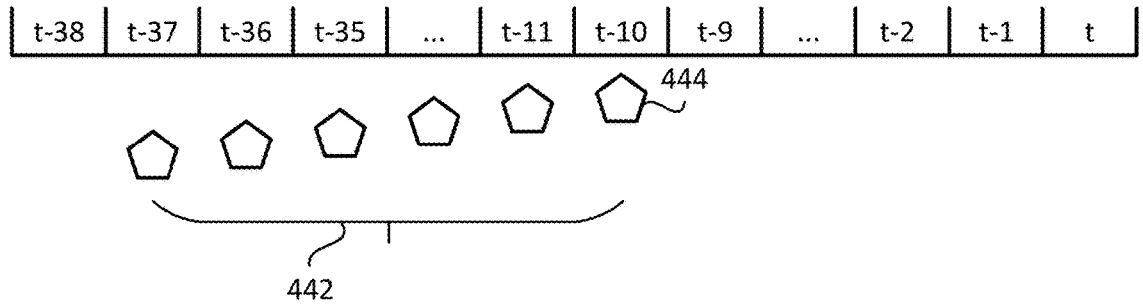
FIG. 4F schematically depicts deletion of a trajectory according to certain embodiments of the present disclosure, where there is no matched person or package to the trajectory for a large number of frames.

The width and height of the bounding boxes 430 and 432 may be averages of the widths and heights of the bounding boxes 428 and 434. Further, when the trajectory 426 is a person tracking trajectory, in the interpolated positions 430 and 432, keypoints of the persons are also added. The location of the keypoints in the positions 430 and 432 can be calculated the same way as the calculation of the bounding box centers. As shown in FIG. 4D, the postprocessed bounding box 436 does not match the latest positions of any trajectories, and a new trajectory is initialized, with the postprocessed bounding box 436 as the first position of the new trajectory. As shown in FIG. 4E, there is a trajectory 438. The first position of the trajectory 438 is frame t−29, and the latest position of the trajectory 438 is position (bounding box) 440 in the frame t−5. None of the postprocessed bounding boxes matches the latest position 440. Since the latest position 440 is within a predetermined number of frames, such as within 10 frames from the current frame, the trajectory 438 is kept. In certain embodiments, the predetermined number may vary from 2-30 frames. In certain embodiments, the predetermined number is 5-15. In this embodiment, the predetermined number is set at 10. As shown in FIG. 4F, there is a trajectory 442. The first position of the trajectory 442 is frame t−37, and the latest position of the trajectory 442 is position (bounding box) 444 in the frame t−10. None of the postprocessed bounding boxes matches the latest position 444. Since the latest position 440 is 10 frames away from the current frame, the trajectory 442 is discarded. As described above, the discard threshold or the predetermined number may vary.

Kindly note that the trajectories shown in FIGS. 4B-4F may be a person tracking trajectory or a bounding box tracking trajectory, the trajectory can start from any frame, where the person or the package is first detected. Only bounding box is needed for the match between a postprocessed person/package bounding box and the bounding box at the latest position of a person/package trajectory. In certain embodiments, the keypoints may also be used for matching postprocessed person bounding box, but it consumes a lot of computing resources and is not preferred. In certain embodiments, the tracking module 150 is configured to perform dual-tracking to track persons and packages in parallel, and the postprocessed person bounding boxes are only compared to the latest positions of person tracking trajectories, and the postprocessed package bounding boxes are only compared to the latest positions of package tracking trajectories. In certain embodiments, the tracking module 150 is configured to use the tracking-by-detection framework as described above to initiate and update trajectories of persons and packages separately. In certain embodiments, instead of calculating Euclidean distance between the detected person/package bounding box to the latest position of the person/package trajectories, finding the best match using greedy search optimization algorithms based on the nearest neighbor measure, the tracking module 150 can also use other measurements, such as detected bounding boxes, edges of object, appearance similarity of color, or deep features and associated algorithms, such as multiple hypothesis tracking, hypergraph-based association, pose-estimation and tracking, to complete the person tracking and package tracking tasks. After updating the person tracking trajectories and the package tracking trajectories, the tracking module 150 is further configured to send the updated trajectories to the action recognition module 152.

The action recognition module 152 is configured to, upon receiving the updated person tracking trajectories and package tracking trajectories from the tracking module 150, update actions using the received person tracking trajectories and motion package tracking trajectories, recognize rough handling actions from the updated actions, and send the rough handling actions to the output module 154. As described above, each of the person tracking trajectories received from the tracking module 150 includes a person's bounding box and keypoints at each time point or each frame, and each of the package tracking trajectories received from the tracking module 150 includes a package's bounding box at each time point or each frame. A complete action includes a number of consecutive frames of a person trajectory and a corresponding package trajectory. The action recognition module 152 starts an action when the person picks up the package, continues when the person holds and drops off the package, and ends after a predetermined number of frames after the drop-off. The predetermined number is in a range of 5-50 frames. In certain embodiments, the predetermined number is 10-25 frames. In certain embodiments, the predetermined number is 20. Assume the current time is t (or the current frame t), and the immediate previous time is t−1 (or the previous frame t−1), the action recognition module 152 has the actions from the previous time t−1, and will update the actions using the person and package trajectories that have been updated using the frame t. Each of the actions may include a person picking up, and optionally holding and dropping a package.

$$\text{Let } A^{t-1} = \{a_1^{t-1}, \dots, a_{s_{t-1}}^{t-1}\}$$

be me actions at time t−1, where $s_{t-1}$ is the total number of actions at time t−1. Each action a contains information of the person who incurs the action and the package which is picked up by the person from the start of the action to the (t−1)-th frame. The update of the actions at time t is as follows.

Figure 5A:
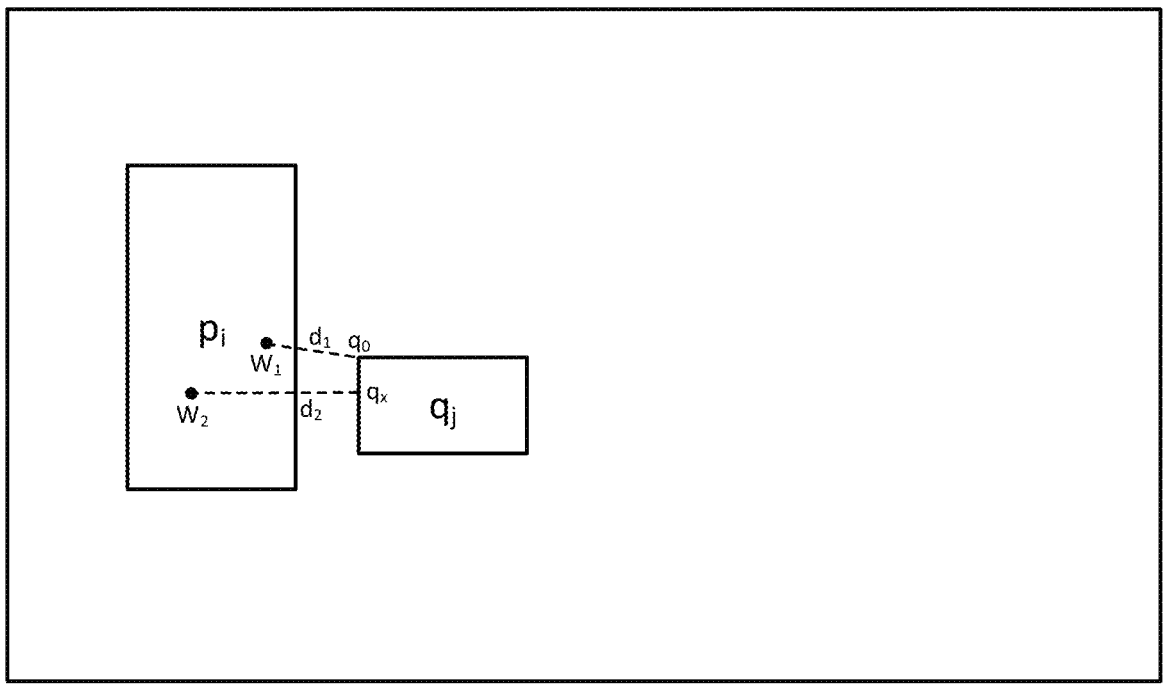
FIG. 5A schematically depicts calculation of a distance from a person to a package according to certain embodiments of the present disclosure.

At time t, there is a person $p_i$ and his tracking trajectory $f_i^t$, and there is a package $q_j$ and its tracking trajectory $g_j^t$. Each position of the person tracking trajectory $f_i^t$ includes a bounding box and keypoints of the person $p_i$, and each position of the package tracking trajectory $g_j^t$ includes a bounding box for the package $q_j$. The action recognition module 152 is first configured to determine whether the person $p_i$ picks up, holds, or drops the package $q_j$ at time t according to the person's keypoints information in its tracking trajectory $f_i^t$, and the package's bounding box information in its tracking trajectory $g_j^t$. FIG. 5A shows determination of distance between a person's wrist keypoints and a package bounding box according to one example of the present disclosure. As shown in FIG. 5A, in the current frame, the person $p_i$ has two wrist keypoints $w_1$ and $w_2$, the package $q_j$ has an upper-left corner point $q_0$. The closest distance $d_1$ from the wrist keypoint $w_1$ to the package bounding box is the distance between keypoint $w_1$ and $q_0$, and the closest distance $d_2$ from the wrist keypoint $w_2$ to the bounding box is the distance between keypoint $w_2$ and $q_x$, where the straight line $w_2$-$q_x$ is perpendicular to the left edge of the package bounding box. Since the distance $d_1$ is less than the distance $d_2$, the distance $d_1$ is defined as the distance between the person's wrist to the package bounding box. In certain embodiments, when the distance between any of the wrist keypoints of the person $p_i$ and the bounding box of the package $q_j$ at time t is within a predetermined distance, the action recognition module 152 determines that the person $p_i$ picks up the package $q_j$ at the time t. In certain embodiments, the predetermined distance is in a range of 2-50 pixels. In certain embodiments, the range is 5-20 pixels. In certain embodiments, the predetermined distance is set at 10 pixels. Based on these information, the action recognition module 152 is further configured to update the action sets $A^{t-1}$ to $A^t$, i.e., if a person $p_i$ picks up a package $q_j$, this module starts to record a potential action $a_{i,j}^t$; if a person $p_i$ holds or drops a package $q_j$, this module updates related action $a_{i,j}^{t-1}$ to $a_{i,j}^t$ with person and package position information; if a person $p_i$ drops a package $q_j$ for a while, this module updates related action $a_{i,j}^{t-1}$ to $a_{i,j}^t$ with package position information, and calculates the distance and the speed that package $q_j$ travels based on its tracking information.

Figure 5B:
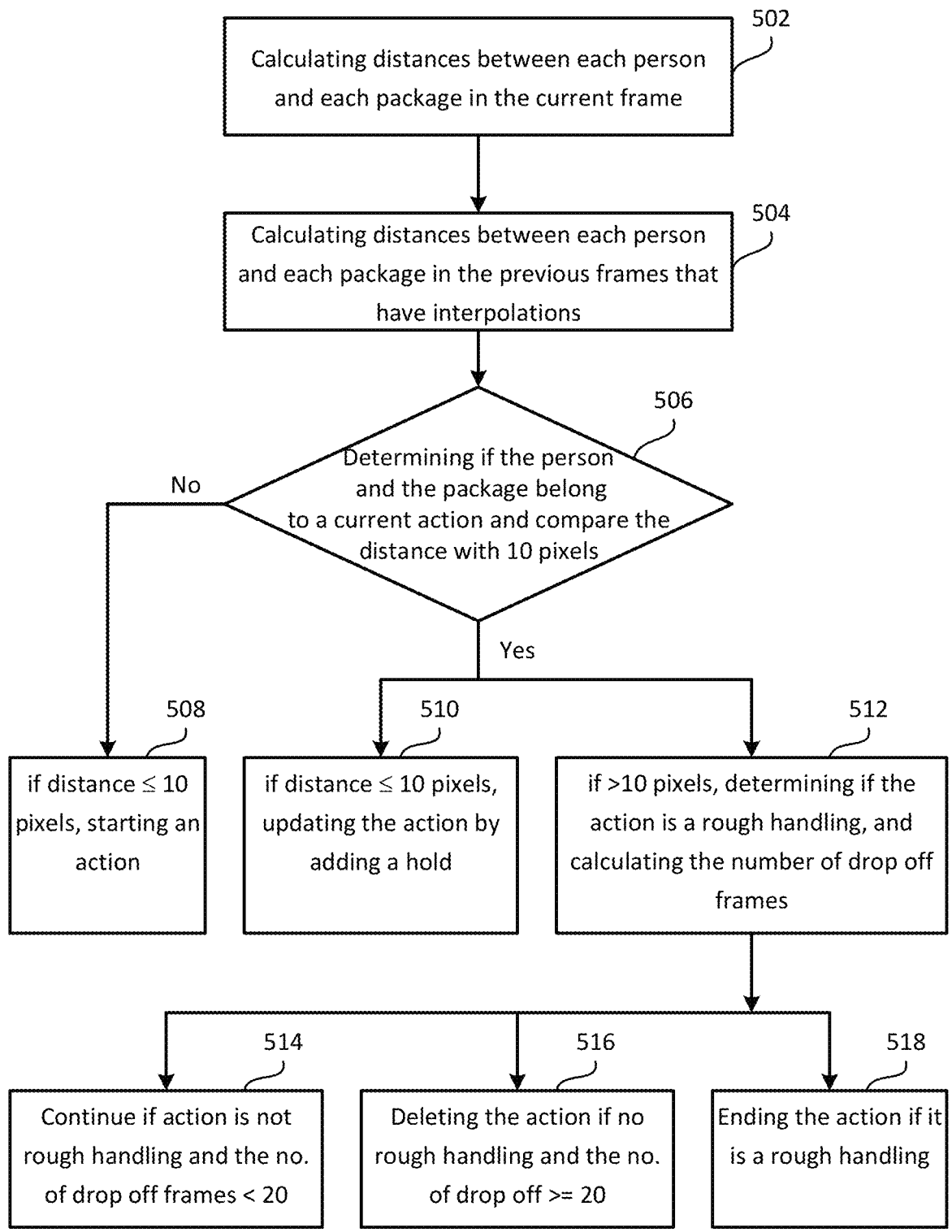
FIG. 5B schematically depicts a conceptual workflow for updating actions according to certain embodiments of the present disclosure.

FIG. 5B schematically depicts a flowchart 500 for updating actions according to certain embodiments of the present disclosure, but the disclosure is not limited thereto. As shown in FIG. 5B, at procedure 502, the action recognition module 152 calculates distance between any one of the persons and each of the packages that are detected at current time t (or in the current frame t). For each trajectory, there may be added interpolated positions for the persons or the packages in their trajectories. At procedure 504, the recognition module 152 also calculates, for each interpolated person, the distances between the interpolated person and the packages or interpolated packages at that time (in the frame having the position of the interpolated person); and for each interpolated package, the distances between the interpolated package and the persons or interpolated persons at that time (in the frame having the position of the interpolated package). In certain embodiments, each of the calculated distances is labeled, so that there will be no repeated calculation for the distance between the same person (or interpolated person) and the same package (or interpolated package) in the same frame.

At procedure 506, the recognition module 152 determines if the person and the package for calculating a distances belong to an action, i.e., if there is already an action between the person and the package, and compares the distance with a predetermined distance. In certain embodiments, the threshold distance is 10 pixels.

If the recognition module 152 determines at procedure 506 that the person and the package for calculating their distance do not belong to an action, and the calculated distance between them equals to or is less than the predetermined distance of 10 pixels, at procedure 508, the recognition module 152 starts an action, and defines the status of the action at the current time as pickup. If the person and the package do not belong to an action and their distance is more than 10 pixels, there is no need for further analysis because there is no interaction between the person and the package. In certain embodiments, when there are interpolations of the person or the package, the recognition 152 may start the action from the earliest interpolated frame having the distance less than 10 pixels, and the status of the action in the frames following the start of the action is updated withhold or drop off according to the distances in the respective interpolation frames. After procedure 508, the process continues with the other person-package pairs, or continues to the next frame if all the person-package pairs have been analyzed.

If the recognition module 152 determines at procedure 506 that the person and the package belong to an action, and the distance between them equals to or is less than the predetermined distance of 10 pixels, at procedure 510, the status of the action at the current time is defined as holding, since there is already a pickup action in one of the previous frames (the first frame of the action). In certain embodiments, when there are interpolations of the person or the package, the recognition 152 may update the status of the interpolated frames in the action according to the distances in the respective interpolation frames. After the procedure 510, the process continues with the other person-package pairs, or continues to the next frame if all the person-package pairs have been analyzed.

If the recognition module 152 determines that the person and the package belong to the same action and the distance between them is greater than 10 pixels, at procedure 512, the recognition module 152 determines whether the action is a rough handling as follows. The status of the action in the previous frame could be pickup, holding, or drop off.

Figure 5C:
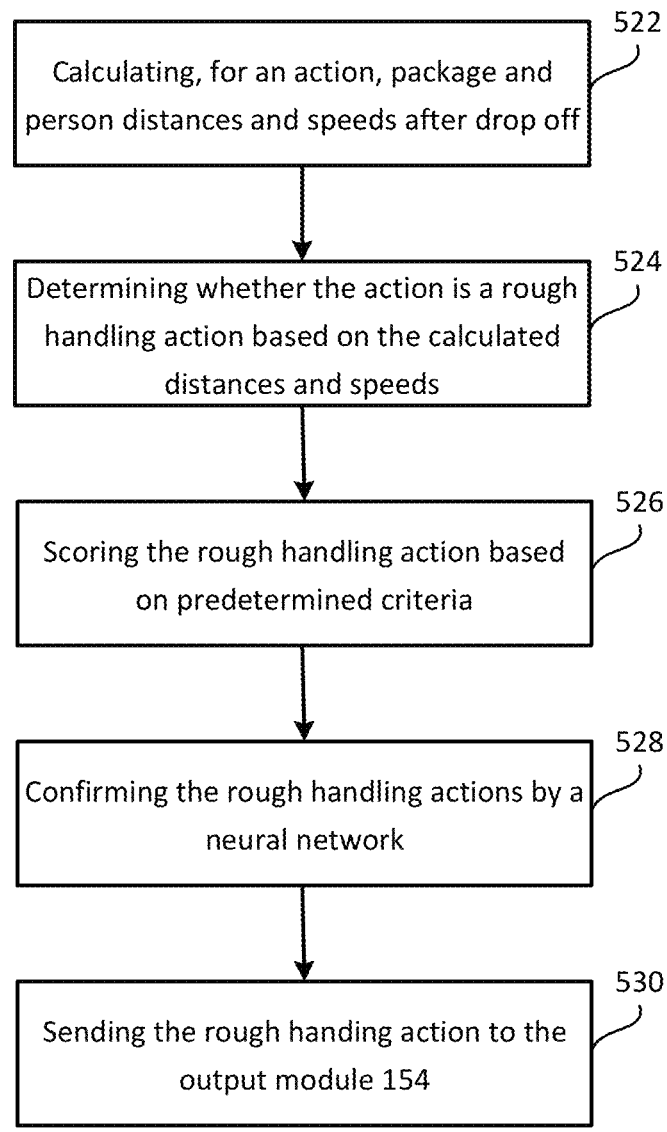
FIG. 5C schematically depicts a conceptual workflow for determining whether an action is a rough handling action according to certain embodiments of the present disclosure.

FIG. 5C schematically depicts a flowchart 520 for determining whether an action is a rough handling according to certain embodiments of the present disclosure, but the disclosure is not limited thereto. As shown in FIG. 5C, at procedure 522, the recognition module 152 calculates distances and speeds of the package and the person after drop-off; at procedure 524, the recognition module 152 determining whether a rough handling action exists based on the calculated distances and speeds; at procedure 526, when the action is determined to be a rough handling action, the recognition module 152 provides a score to the rough handling action based on predetermined criteria; at procedure 528, the recognition module 152 may confirm the rough handing actions using a neural network, where this step is optional; and then at procedure 530, the recognition module 152 sends the rough handling action information to the and the score to the output module 154.

Figure 5D:
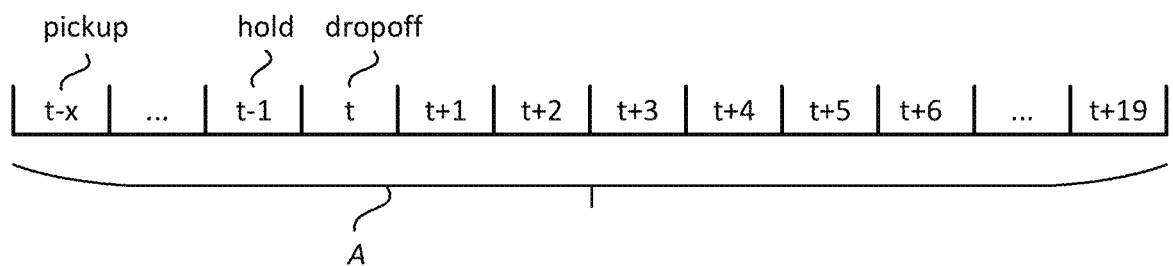
FIG. 5D schematically depicts an action according to certain embodiments of the present disclosure.
Figure 5E:
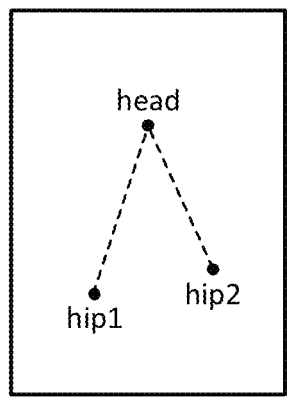
FIG. 5E schematically depicts a person torso calculation according to certain embodiments of the present disclosure.
Figure 5F:
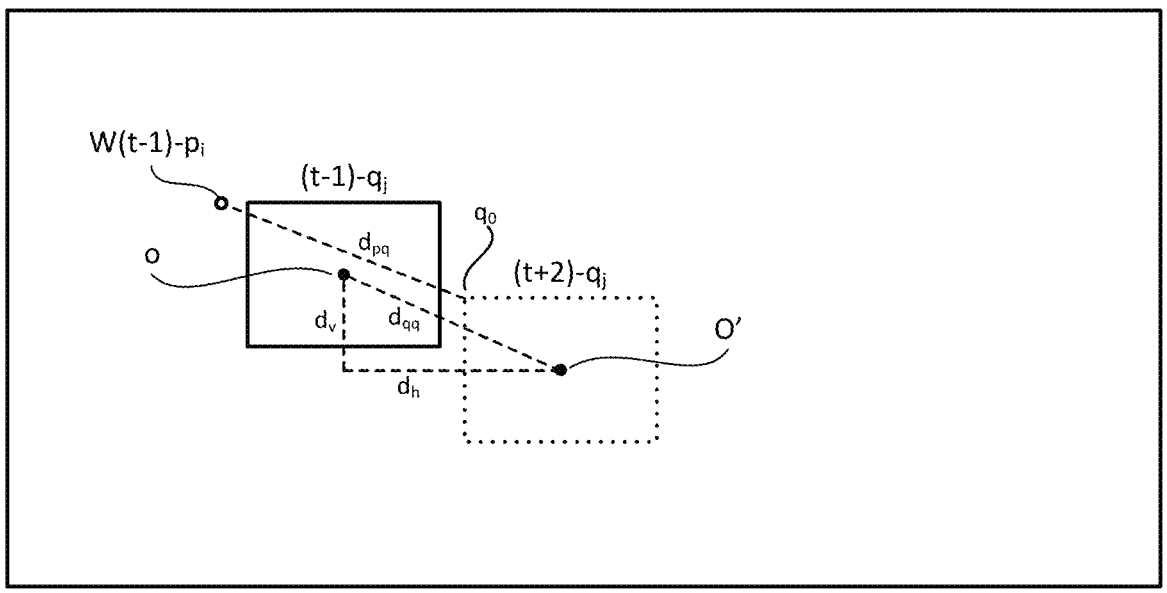
FIG. 5F schematically depicts calculation of certain distances between a person and a package in different frames, and between the package in different frames according to certain embodiments of the present disclosure.

The calculations are shown in FIGS. 5D-5F. FIG. 5D shows an action A of a person $p_i$ operates a package $q_j$. The action starts from frame t-x, where the person $p_i$ picks up the package $q_j$; the person $p_i$ then holds the package $q_j$ for a while until frame t-1; at frame t, the person $p_i$ drops off the package $q_j$; and the action ends when a predetermined number of frames having the status of drop-off (for example 20 frames from frame t to frame t+19), or ends at any frame between the frame t to frame t+19 when rough handing is observed. In certain embodiments, the predetermined number is 10-30 frames. In the embodiment shown in FIG. 5D, the predetermined number is 20. In certain embodiments, the distances are calculated in reference to a size of a human torso or human trunk. As shown in FIG. 5E, the person $p_i$ has a head keypoints and two hip keypoints in a frame. A pixel distance $d_{head-hip1}$ can be determined in the frame, a pixel distance $d_{head-hip2}$ can be determined in the frame, and the size of the human torso of the person $p_i$ is the average of distance $d_{head-hip1}$ and distance $d_{head-hip2}$, which is defined as $d_{torso}$. In certain embodiments, the size of the human torso in the frame t-1 is used as to calculate $d_{torso}$, and the distances and speeds are calculated by comparing to the $d_{torso}$. In certain embodiments, the calculation of distances and speeds for each frame can also use the human torso in that frame as the reference. For example, if the human torso is 10 pixels, a distance is 20 pixels, then a reference distance is the distance divided by the torso, that is, 20 pixels/10 pixels=2.

In certain embodiments, in order to have reliable calculation, the calculation of distances and speeds starts several frames after drop-off, such as starts from the frame t+2, three frames from the last holding frame t-1. FIG. 5F schematically depicts calculation of the distances from the frame t-1 to the frame t+2 and the speeds at the frame t+2. In a standard sized frame, $(t-1)-q_j$ is the bounding box of the package $q_j$ in the frame t-1, which has a center point o; $(t+2)-q_j$ is the bounding box of the package $q_j$ in the frame t+2, which has a center point o' and a upper-left corner point $q_0$; $w_{(t-1)-p_i}$ is one of the wrist keypoints of the person $p_i$ in the frame t-1, which is closer to the package bounding box $(t-1)-q_j$ than the other of the wrist keypoints. Using the calculation for the frame t+2 as an example, the distances and speeds can be calculated as follows.

(1) Package horizontal distance $d_h$, which is the horizontal pixel distance from the center o to the center o', and the reference package horizontal distance is $d_h/d_{torso}$.

(2) Package vertical distance $d_v$, which is the vertical pixel distance from the center o to the center o', and the reference package vertical distance is $d_v/d_{torso}$.

(3) Package distance $d_{qq}$, which is the pixel distance from the center o to the center o', and the reference package distance is $d_{qq}/d_{torso}$.

(4) Person-package pixel distance $d_{pq}$, which is the distance between the wrist keypoint $w_{(t-1)-p_i}$ and the point $q_0$. Kindly note that the person-package pixel distance $d_{pq}$ is the closest distance between the wrist keypoint $w_{(t-1)-p_i}$ and the edges of the package bounding box $(t+2)-q_j$. The distance $d_{pq}$ is the distance between the wrist keypoint $w_{(t-1)-p_i}$ and the point $q_0$ as shown in FIG. 5F, but can also be a distance between $w_{(t-1)-p_i}$ and another point in the edges of the package bounding box $(t+2)-q_j$ under other situations, as long as $d_{pq}$ is the closest distance between the wrist keypoint and the bounding box.

(5) Person-package distance, which is $d_{pq}/d_{torso}$.

(6) The instantaneous speed $v_{(t+2)}$ is calculated based on the reference package distance in a predetermined number of previous frames. In certain embodiments, the predetermined number of frames is set at two or three. When the predetermined number of frames is set at three, the instantaneous speed $v_{(t+2)}$ at the frame t+2 is calculates as:

$$v_{(t+2)} = \frac{d_{(t-1) \; to \; (t+2)}}{3 \times d_{torso}},$$

where $d_{(t-1) \; to \; (t+2)}$ is the pixel distance between the package bounding box centers of frame (t−1) and the frame (t+2). Similarly, the instantaneous speed $v_{(t+3)}$ at the frame t+3 is calculated as:

$$v_{(t+3)} = \frac{d_{t \; to \; (t+3)}}{3 \times d_{torso}},$$

where $d_{t \; to \; (t+3)}$ is the distance between the package bounding box centers of frame t and the frame (t+3). A maximum speed $v_{max}$ is also defined, which is the maximum of the calculated instantaneous speeds for the frames from the frame t+2 to the current frame. Accordingly, $v_{max(t+2)}$ is the instantaneous speed $v_{(t+2)}$ when the current frame is the frame t+2 because $v_{(t+2)}$ is the only instantaneous speed we have now. When the current frame is the frame t+3, $v_{max(t+3)}$ will be the larger of the instantaneous speeds $v_{(t+2)}$ and $v_{(t+3)}$, and when the current frame is the frame t+4, $v_{max(t+4)}$ will be the largest of the instantaneous speeds $v_{(t+2)}$, $v_{(t+3)}$, and $v_{(t+4)}$. In certain embodiments, the disclosure only stores one $v_{max}$, where it's value is updated whenever a new instantaneous speed at the current frame is larger than the value of the stored $v_{max}$.

(7) The acceleration a is calculated based on the average speed at the current frame and the average speed at the previous frame. Accordingly, the acceleration $a_{(t+3)}$ at the frame t+3 is calculated as: $a_{(t+3)} = v_{(t+3)} - v_{(t+2)}$.

(8) The average speed at the current frame, which is the distance the package moved from the frame t−1 to the current frame divided by the number of frames and the torso. Accordingly, the average speed at frame t+2 is $$v_{average(t+2)} = \frac{d_{(t-1) \; to \; (t+2)}}{3 \times d_{torso}},$$

the same as the instantaneous speed. The average speed at frame $$t+3 \; \text{is} \; v_{average(t+3)} = \frac{d_{(t-1) \; to \; (t+3)}}{4 \times d_{torso}},$$

and the average speed at frame t+4 is $$v_{average(t+4)} = \frac{d_{(t-1) \; to \; (t+4)}}{5 \times d_{torso}}.$$

In certain embodiments, after calculation of the distance and speeds, the action recognition module 152 is configured to, from a frame that is a predetermined number of frames away from the last hold frame, determine whether the action is a rough handling according to certain criteria. The predetermined number of frames can be, for example, 2-12 frames. In certain embodiments, the predetermined number is set at 6, and referring back to FIG. 5D, the last hold frame is frame t−1, and the determination of whether the action is a rough handling starts from the frame t+5, 6 frames away from the frame t−1. The criteria for a rough handling at the frame t+5 include: (1) at least one of $d_h/d_{torso}$ and $d_v/d_{torso}$ is greater than 1; (2) $1 \leq d_h/d_{torso} \leq 5$; (3) $d_{pq}$ is greater than 30 pixels; (4) $d_{pq}/d_{torso}$ is greater than 1; (5) $v_{max(t+5)}$ is greater than 0.1 (the greatest one from the instantaneous speeds $v_{(t+2)}$, $v_{(t+3)}$, $v_{(t+4)}$, and $v_{(t+5)}$), or the package at the current frame has a high speed mark (package bounding box of the current frame is generated through the high speed blur area); and (6) $0.05 \leq a_{(t+5)} \leq 1$; (7) the average speed at the current frame $v_{average(t+5)}$ is greater than 0.1. If all the above criteria (1)-(7) are satisfied at the frame t+5, the action is determined as a rough handling action, and there is no need to make determination for the frames after the frame t+5. If the above criteria are not satisfied at the frame t+5, the distance and speed calculations and the rough handling determination will be performed for the frame t+6. The calculation and determination will be ended when one of the frames meets all the criteria. As described below at procedure 516, if after a predetermined number of frames, none of the frames meets all the criteria, then the action is not a rough handling, and the action recognition module 152 will delete the action. The predetermined number of frames may be, for example 10-50 frames. In certain embodiments, the predetermined number is 20, and the calculation and determination will stop at frame t+19, which is 20 frames away from the frame t−1. Kindly note the above criteria are provided for interpretation only, and the criteria may vary according to the conditions of the practice.

In certain embodiments, after determining that an action is a rough handling, the action recognition module 152 may be further configured to provide a rough handling score for the action. In certain embodiments, the rough handling action is categorized as a high rough handling action or a light rough handling action, where the high rough handling action is given a score of 3 and the light rough handling action is given a score of 1. The requirements for the high rough handling include: accumulated distance >=3.0, or average speed >=0.2, or max speed >=0.3. Accordingly, the requirements for the light rough handling include: accumulated distance <3.0 and average speed <0.2 and max speed <0.3. Take the frame t+5 as an example, the accumulated distance is $d_{pq}/d_{torso}$ at frame t+5, the average speed is $$v_{average(t+5)} = \frac{d_{(t-1) \text{ to } (t+5)}}{6 \times d_{torso}},$$

and the max speed $v_{max(t+5)}$ is the greatest of the instantaneous speeds $v_{(t+2)}$, $v_{(t+3)}$, $v_{(t+4)}$, and $v_{(t+5)}$, where the frame t−1 is the last hold frame, and the frame t is the drop-off frame.

In certain embodiments, the rough handling action is categorized as a high, medium, or a light rough handling action, where the high rough handing action is given a score of 3, the medium rough handing action is given a score of 2, and the light rough handing action is given a score of 1. The requirements for the high rough handling include: accumulated distance >=3.0, or average speed >=0.2, or max speed >=0.3. The requirements for the medium rough handling are: 3.0>accumulated distance >=1.5, 0.2>average speed >=0.15, and 0.3>max speed >=0.25. All the rough handling actions do not meet the requirements for high or medium requirements are light handling actions.

In certain embodiments, when interpolated frames are available, the interpolated frames can also be analyzed as a current frame as described above to determine if there is rough handing.

In certain embodiments, the recognition module 152 is further configured to determine, for a package in an action, whether the package detection in the current frame is lost. If so, the tracking of the package is deleted, and the action is deleted.

When the recognition module 152 determines at procedure 512 that the action is not rough handling, and the number of drop off frames from the first drop off frame to the current frame is less than 20 frames, at procedure 514, the status of the current frame is updated as drop-off, the process continues with the other person-package pairs, or continues to the next frame if all the person-package pairs have been analyzed.

When the recognition module 152 determines at procedure 512 that the action is not rough handling, and the number of drop off frames from the first drop off frame to the current frame equals to or is greater than 20 frames, at procedure 516, the recognition module 152 delete the action, and the process continues with the other person-package pairs, or continues to the next frame if all the person-package pairs have been analyzed. The action is deleted because the system is certain that the action is not a rough action after the package has been drop off for a period of time sufficient to make the judgment.

When the recognition module 152 determines at procedure 512 that the action is a rough handling, at procedure 518, the recognition module 152 end the action, and sends the rough handling action to the output module 154. Then the process continues with the other person-package pairs, or continues to the next frame if all the person-package pairs have been analyzed. The action is ended because the system is certain that the action is a rough action based on the current available drop off frames, and it is not necessary to do more analysis on the action. After determination of the action between the person $p_i$ and the package $q_j$ as a rough handling action, the rough handling action information includes: the video clip of the rough handling action (from the pickup frame to 20 frames from the last hold frame, or 19 frames from the drop-off frame), human bounding box and keypoints in the frames of the action for the person $p_i$, package bounding boxes in the frames of the action for the package $q_j$, the calculated distances, the calculated speeds, and the rough handling score. The recognition module 152 is then configure to output the rough handling action information to the output module 154.

In certain embodiments, the recognition module 152 is optionally configured to, before outputting the rough handing action information to the output module 154, subject the video clip of the rough handing action to a neural network to confirm whether the action is a rough handling. But the above described determination already has high accuracy, the neural network confirmation may not be necessary. In certain embodiments, the neural network is implemented as a filter model to remove certain negative cases of the rough handling actions. The input of the module is the video clip of the determined rough handling action, together with related person and package trajectories. In certain embodiments, the model is I3D, which is a deep learning neural networks. The I3D is configured to classify the input video clip into two classes: rough action or normal action. The I3D model is a 3D convolutional neural network and trained by video clips in the two action classes. Notably, other measurements (e.g., body keypoints trajectories and package trajectories) and association algorithms (e.g., pose estimation method and other action recognition methods etc.) can also be used to do this task. The output of this module is the positive action items filtered by the network.

Based on the above description, it could be understand that an action could end 1) when we confirm it is a rough action before the 20-th frame, or 2) delete the action if the action is still not a rough action at the 20-th frame (the speed will decrease as the package is threw away, and it cannot be a rough handling action after the 20-th frame), or 3) the action is not rough action before the 20-th frame, and the package is re-picked up by a person, if so, then it comes to the loop pick up-hold-drop off again.

Referring back to FIG. 1, the output module 154 is configured to, upon receiving the rough handling action information (with or without filtering by the I3D model), prepare a rough handling report, and send the rough handling report to the interface 156. The preparation may include make a video clip of the rough handling action, record the calculated distances and speeds for the relevant frames in the video clip, record the score of the rough handling action, optionally retrieve the complete trajectory of the person who causes the rough handling action and retrieve the complete trajectory of the package that is roughly handled, and optionally prepare a warning sound recording or a warning message for the rough handling.

The user interface 156 is configured to, upon receiving the prepared report, send the report to the displaying device 190 for displaying the report. In certain embodiments, a responsible administrator monitors the report from the displaying device 190. When a rough handing report is available, the administrator would view the report, especially the video clip of the report on the displaying device, confirm the rough handling, notify the worker (person) that causes the rough handling, and check the package that is roughly handled by the worker.

In certain embodiments, there is no need for the administrator to involve the process, and the displaying device 190 is installed to a place viewable by the worker and has a speaker or messaging function, such that the displaying 190 can broadcast the warning sound recording to the worker or send the warning message to the worker, and the worker can response accordingly, such as be aware of his handling practice, and possibly check the package he roughly handled.

In certain embodiments, the user interface 156 is further configured for an administrator of the system to adjust parameters of the imaging device 110, the computing device 130, the detection model service 170, the displaying device 190, and the parameters of the rough handling recognition application 138.

As described above, the detection model service 170 is preferably an independent service configured to receive frames from the detection module 146, detect persons and packages in the frames, and send the detected persons and packages of the frames to the detection module 146. The frames in the detection model service 170 can be processed in parallel. The detection results may include the ID such as the camera ID of the frames, timestamp or frame number of the frames, detected persons in the frames including bounding boxes and keypoints of the persons, and detected packages in the frames which are bounding boxes of the packages.

The displaying device 190 is configured to, upon receiving the output from the interface 156, display the rough handling to the administrator. In certain embodiments, the display device 190 is configured to display the video clip of the rough handling action, with the person bounding box of the worker causing the rough handling and the package bounding box of the rough handled package. In certain embodiments, the calculated distances and speeds, and the status of pickup, hold, and drop-off may be hide in the display, and can be shown if the administrator choose to do so. The display device 190 may be a computer monitor, a TV, or even an audio device that is configured to broadcast a warning voice or a warning message. In certain embodiments, the display device 190 may be controlled by a computing device external to and in communication with the computing device 130, or in certain embodiments, the computing device 130.

Kindly note that the system 100 may further include other components when needed, and not all the components shown in FIG. 1 are necessary for all the applications. For example, the detection model service 170 may not be necessary when the computing load is not heavy, and the function of the detection model service 170 is directly placed in the tracking module 150. In certain embodiments, the system 100 monitors rough handling at real time. In other embodiments, the system 100 may also determine rough handling using recorded videos.

Figure 6:
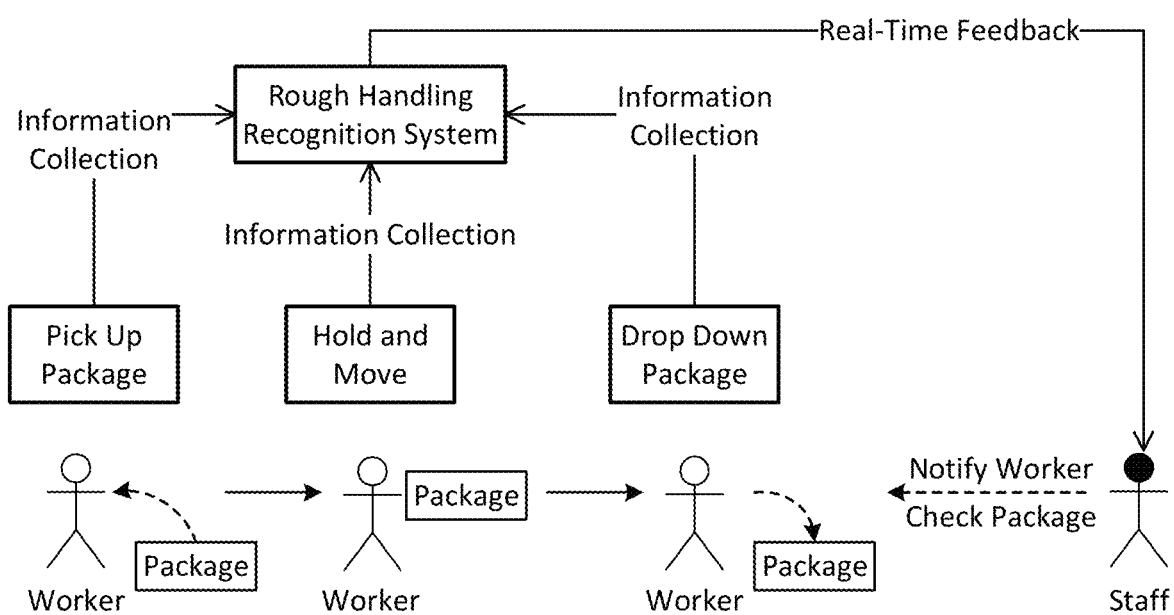
FIG. 6 schematically depicts a conceptual workflow of a rough handling recognition system according to certain embodiments of the present disclosure.

FIG. 6 schematically shows a conceptual workflow 600 of a rough handling recognition system according to certain embodiments of the present disclosure. As shown in FIG. 6, the rough handling recognition system collects the information of the handling process of workers, from workers pick up packages to drop down, and provides real-time feedback to staff in the backstage. When the system identifies a rough handling action, it sends the video clip of the rough handling action to the backstage, and alarms distribution staff that the worker handled the package roughly. Then the staff can notify the worker to handle the package more carefully and reduce potential package damage loss. Therefore, one staff is able to serve multiple handling areas and monitor numbers of workers at the same time. It can help decrease labor cost, reduce the ratio of package damage, and decrease potential complaints from the package owner.

Figure 7:
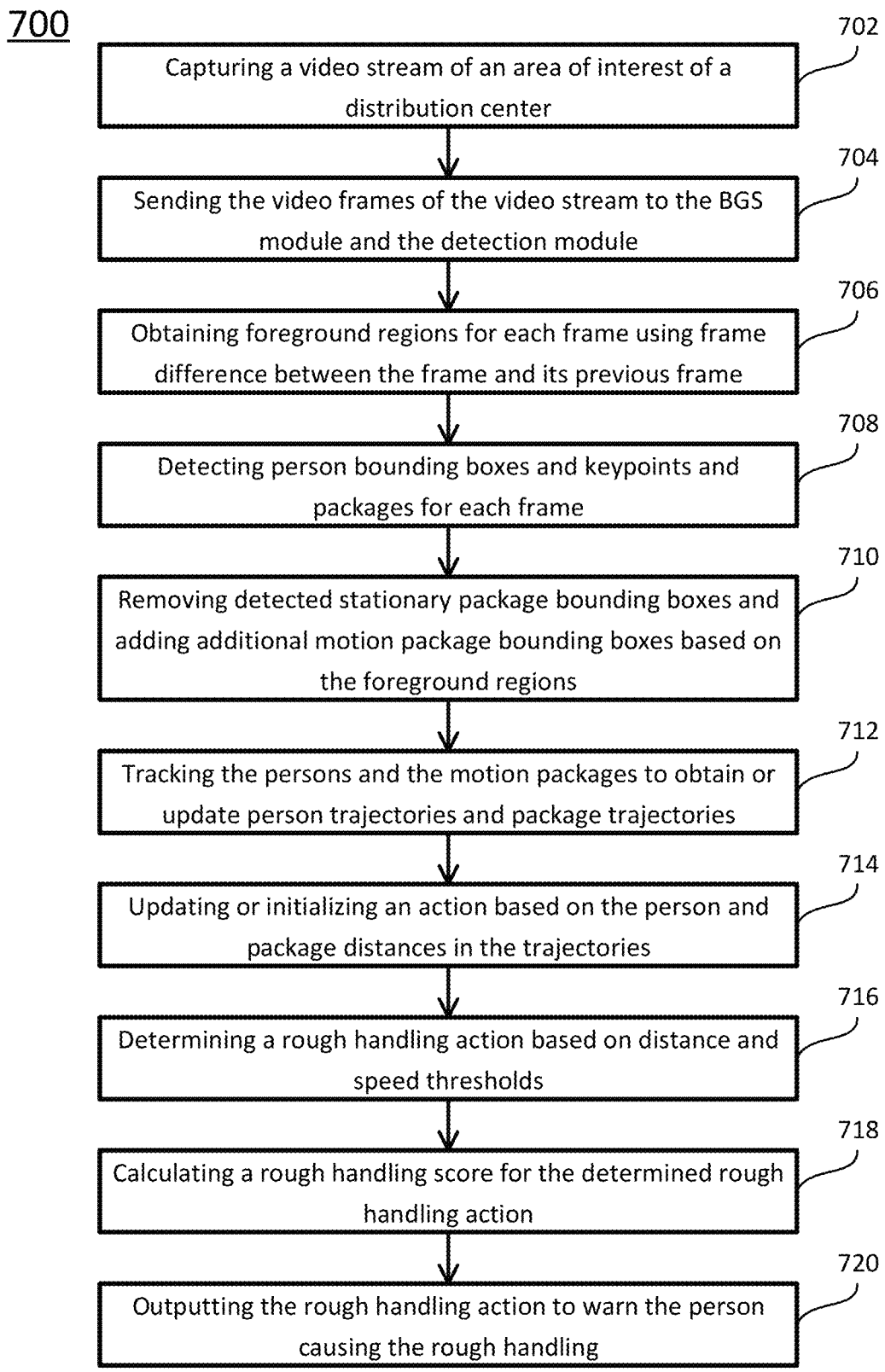
FIG. 7 schematically depict a method of recognizing rough handling actions according to certain embodiments of the present disclosure.

In certain aspects, the present disclosure relates to a method for recognizing or monitoring rough handling. FIG. 7 schematically depicts a rough handling recognition method, which may be implemented by the system 100 shown in FIG. 1. In certain embodiments, the method 700 shown in FIG. 7 corresponds to the function of the rough handling recognition application 138. It should be particularly noted that, unless otherwise stated in the present disclosure, the steps of the method may be arranged in a different sequential order, and are thus not limited to the sequential order as shown in FIG. 7.

As shown in FIG. 7, at procedure 702, the video capture module 140 instructs the imaging device 110 to take a video stream of an area of interest at real time, and sends the video stream to video decoder 142. The imaging device 110 may be a wide-angle surveillance camera, and the area of interest may be work areas of package distribution centers of ecommerce companies. There may be multiple imaging devices 110 installed in several different package distribution centers, and each of the imaging devices 110 covers a work area, which may include one or a few conveyor belts and one or a few workers adjacent to the conveyor belts and handle packages in the area. Each video stream includes real-time video frames, each video frame has a camera ID identifying the imaging device 110 that captures the video frames, has a timestamp or frame number of the video frame, and the video frame itself, for example, an analog or digital RGB image. The frame rate of the video stream may vary based on the scenes and the hardware, and can be, for example, 30 fps.

At procedure 704, upon receiving the video frames from the imaging device 110, the video decoder 142 decodes each video stream to video frames, and sends each video frame to the BGS module 144 and the detection module 146. In certain embodiments, the video decoder 142 stores the video frames in each video stream as a queue, and the queue ID is the same as or is equivalent to the device ID or the camera ID. In certain embodiments, the video streams include analog video frames, and the video decoder 142 will convert the analog signal to digital signal. The video streams are processed in the same way in parallel by the modules of the rough handling recognition application 138, and the following procedures are explained using one of the video streams. The example video stream has its specific camera ID, and has T number of frames: 1, . . . , t−1, t, t+1, T The t-th frame is the current frame, and T and t are positive integers. The t-th frame has its camera ID, timestamp, and the digital image.

At procedure 706, upon receiving the t-th frame from the video decoder 142, the BGS module 144 subtracts the (t−1)-th frame from the t-th frame to obtain t-th foreground regions of the t-th frame, and sends the t-th foreground regions to the postprocessing module 148. In certain embodiments, the BGS module 144 performs the subtraction by: converting the RGB values of the pixels in the (t−1)-th frame and the t-th frame to grayscale values of 0-255, calculating pixelwise difference between the (t−1)-th frame and the t-th frame, comparing the absolute value of the difference to a predetermined difference threshold, binarizing the pixel as 1 if the absolute value of the difference equals to or is greater than the difference threshold, binarizing the pixel as 0 if the absolute value of the difference is less than the difference threshold, dilating and eroding the binary values to obtain an initial binary mask containing blubs having the value 1, and filtering the blubs in the initial mask using a blub threshold to obtain the t-th foreground regions of the t-th frame. In certain embodiments, the predetermined difference threshold is 20. In certain embodiments, the blub filtering threshold is 1000 pixel, that is, only the blubs having 1000 pixels are kept, and the smaller blubs are deleted. As the result, the t-th foreground regions of the t-th frame includes the camera ID, the timestamp, and the foreground regions of the t-th frame. The t-th foreground regions is denoted as $D^t=\{d_1^t, \ldots, d_f^t\}$. The number of foreground is f, f is 0 or a positive integer, and there is no foreground region when f is 0. $d_1^t$ is the first of the f number of foreground regions, and $d_f^t$ is the f-th of the f number of foreground regions in the t-th frame. In certain embodiments, the procedure 706 may further include filtering the blubs using a predefined size threshold, so as to keep only the blubs that are larger than the predefined size threshold. The predetermined size threshold may be, for example, 1000 pixels in a 1280×720 or 1920×1080 video frame.

At procedure 708, upon receiving the t-th frame from the video decoder 142, the detection module 146 detects person bounding boxes and keypoints and package bounding boxes from the t-th frame, and sends the person bounding boxes and keypoints and package bounding boxes to the postprocessing module 148. In certain embodiments, the detection module 146 uses the detection model service 170 for person detection and package detection. In certain embodiments, the detection model service 170 uses CenterNet to process frames received from the detection module 46 in parallel. The detection model service 170 uses two categories of detection, one category is person detection, and the other category is package detection. The detection model service 170 detects bounding box and keypoints for the person category objects, and detects bounding box only for the package category objects. In certain embodiments, instead of using the detection model service 170, the detection module 146 can also performs the detection function by itself. The detection result for the t-th frame can be represented by $P^t=\{p_1^t, \ldots, p_k^t\}$ and $Q^t=\{q_1^t, \ldots, q_l^t\}$, where t indicates the result for t-th frame, k is a positive integer (or 0 if no person is detected) indicating the number of detected persons in the t-th frame, l is a positive integer (0 of no package is detected) indicating the number of detected packages in the t-th frame, $p_k^t$ is the detection result for the k-th detected person and includes the bounding box and the keypoints of the k-th detected person, and $q_l^t$ is the detection result for the l-th detected package and include the bounding box of the l-th detected package. The result also includes the camera ID and the timestamp of the t-th frame.

At procedure 710, upon receiving the t-th foreground regions of the t-th frame from the BGS module 144 and the detected person bounding boxes and keypoints and package bounding boxes from the detection module 146, the postprocessing module 148 removes detected stationary package bounding boxes and adds additional motion (or moving) package bounding boxes based on the t-th foreground regions to obtain motion package bounding boxes, and sends the person bounding boxes and keypoints and motion package bounding boxes to the tracking module 150. In certain embodiments, the postprocessing module 148 removes stationary package bounding boxes and add additional motion package bounding boxes by: overlapping the detected package bounding boxes from the t-th frame with the t-th foreground regions, removing the detected package bounding boxes that have no overlap or only small overlap with the t-th foreground regions, and when a sufficient large area of the t-th foreground regions has no overlap with any of the detected person bounding boxes and package bounding boxes, adding the additional motion package bounding boxes corresponding to those foreground regions. In certain embodiments, each additional motion package bounding box is labeled with a high speed signal mark. In certain embodiments, the result of the postprocessing module 148 is represented by $P'^t=\{p_1^t, \ldots, p_k^t\}$ and $Q'^t=\{q_1^t, \ldots, q_{l'}^t\}$, where the detected persons are the same as the result from the detection module 146, the bounding boxes only contains motion bounding boxes, and the added additional motion bounding boxes are labeled with high speed signal marks. Here l' is the number l minuses the number of deleted stationary package bounding boxes and adds the number of additional package bounding boxes. In practice, l' is often smaller than the number l. In certain embodiments, the procedure 710 may also include filtering the person bounding boxes and package bounding boxes based on their sizes, such as deleting the person bounding boxes whose corresponding blubs are smaller than 40 pixel×60 pixel, and deleting the package bounding boxes whose corresponding blubs are smaller than 25 pixel×25 pixel.

At procedure 712, upon receiving the person bounding boxes and keypoints and motion package bounding boxes from the postprocessing module 148, the tracking module 150 tracks the persons and the motion packages to obtain or update person tracking trajectories and package tracking trajectories, and sends the updated person tracking trajectories and package tracking trajectories to the action recognition module 152. When the current frame is the first frame of a video, there is no trajectories yet, there is no need for the BGS module 146 and the postprocessing module 148 to perform their functions, a person trajectory is initiated for each of the persons detected by the detection module 146, and a package trajectory is initiated for each of the packages detected from the detection module 146. When the current frame is the t-th frame, there are m person trajectories and n package trajectories available before processing the t-th frame. Each person trajectory may be initialized from any of the previous frames when he was first detected, and is continuously tracked to the (t−1)-frame or one or a few frames previous to the (t−1) frame, which is the latest frame that the person is still seen. Each motion package trajectory may be initialized from any of the previous frames when the motion package was first detected, and is continuously tracked to the (t−1)-frame or one or a few frames previous to the (t−1) frame, which is the latest frame that the motion package is still seen. In other words, a person trajectory or a motion package trajectory is deleted only if the person or the package was not seen for a predetermined number of consecutive frames, such as 5-20 frames, and in one example, the predetermined number of consecutive frames is 10. The position of the person in the latest frame of his trajectory is his last position. The position of the package in the latest frame of its trajectory is its last position. The result from the previous step includes the k number of persons $P'^t=\{p_1^t, \ldots, p_k^t\}$ and the l' number of motion packages $Q'^t=\{q_1^t, \ldots, q_{l'}^t\}$ from the t-th frame. Each person has its bounding box and keypoints, and each package has its bounding box. For each of the k number of persons, the person's bounding box is compared to the last position (person bounding box) of each of them person trajectories to find a match. If a match is found, the person's bounding box from the t-th frame is added to the matched person trajectory as the latest position of the person trajectory. Further, if the last position of the person trajectory before matching is not the (t−1)th-frame, interpolation between the last position and the t-th frame is performed, and person bounding box (or boxes) and keypoints are interpolated. If there is no match, the person's bounding box from the t-th frame is used to establish a new person trajectory. For each of the l' number of motion packages, the package's bounding box is compared to the last position (package bounding box) of each of the n package trajectories to find a match. If a match is found, the package's bounding box from the t-th frame is added to the matched package trajectory as the latest position of the package trajectory. Further, if the last position of the package trajectory before matching is not the (t−1)th-frame, interpolation between the last position and the t-th frame is performed, and package bounding box or boxes are interpolated. If there is no match, the package's bounding box from the t-th frame is used to establish a new package trajectory. For the person and package trajectories that have no matched person or package in the t-th frame, the number of frames between the latest position to the current frame is calculated, and if the number is greater than a threshold, such as 10 frames, the trajectory is deleted. As a result, at time t, there are multiple person trajectories and multiple package trajectories. For a person $p_i$, his tracking trajectory is now $f_i^t$, and for a package $q_j$, tracking trajectory is now $g_j^t$. Each position of the person tracking trajectory $f_i^t$ includes a bounding box and keypoints of the person at that position or frame, and each position of the package tracking trajectory $g_j^t$ includes a bounding box for the package at that position or frame.

At procedure 714, upon receiving the updated person tracking trajectories and package tracking trajectories from the tracking module 150, the action recognition module 152 update actions using the current (updated) person tracking trajectories and motion package tracking trajectories. Each action includes a number of consecutive person tracking positions (or frames) and the corresponding package tracking positions (or frames), starts from the person picks up the package, and ends a predetermined number of frames after the person drops off the package. Assume the actions at time t−1 or at the (t−1)-th frame are $A^{t-1} = \{a_1^{t-1}, \ldots, a_{s_{t-1}}^{t-1}\}$, where there are $s_{t-1}$ number of actions, and each action involves a person trajectory and a package trajectory. The update of the actions are performed for each person trajectory and each package trajectory, and the procedures are described as follows in referring to FIG. 5B.

For the person $p_i$ and the package $q_j$ in the t-th frame, which belong to the person tracking trajectory $f_i^t$ and the package tracking trajectory $g_j^t$, the action recognition module 152 first calculates the distance between the person $p_i$ and the package $q_j$ and records the distance at the procedure 502. When there is one or a few continuous person interpolations in the person tracking trajectory $f_i^t$ immediately before the t-th frame, or one or a few continuous package interpolations in the package tracking trajectory $g_j^t$ immediately before the t-th frame, the distances between the person and the corresponding interpolated package, the interpolated person and the corresponding package, or the interpolated person and the corresponding interpolated package, are all calculated and recorded at procedure 504.

The action recognition module 152 then determines whether the person $p_i$ and the package $q_j$ belong to one of the $A^{t-1}$ and compares the distance between the person $p_i$ and the package $q_j$ a predetermined value of for example 10 pixels at procedure 506. If the person $p_i$ and the package $q_j$ do not belong to one of the actions, the action recognition module 152 sets aside the person $p_i$ and the package $q_j$ if their distance is greater than a threshold, such as 10 pixels; and starts a new action at procedure 508 for the person $p_i$ and the package $q_j$ if their distance equals to or is less than the threshold, where the status of the new action at t-th frame is "pick up."

If the person $p_i$ and the package $q_j$ do not belong to one of the actions, and there are person or package interpolations, the action recognition module 152 will begin the process from the earliest of the frame having the interpolation, for example the (t−3)-th frame, sets aside the person $p_i$ and the package $q_j$ if their distance is greater than the threshold at the (t−3)-th frame, and starts a new action for the person $p_i$ and the package $q_j$ if their distance at the (t−3)-th frame equals to is less than the threshold, where the status of the new action at t-th frame is "pick up." The action recognition module 152 then continues the process for the frames (t−2), (t−1), and t.

If the person $p_i$ and the package $q_j$ belong to one of the actions, and the status of the action at the (t−1)-th frame is "pick up" or "hold," the action recognition module 152 sets the status of the action at the current frame (t-th frame) as "hold" at procedure 510 if the distance between the person $p_i$ and the package $q_j$ at the current frame equals to or is less than the threshold of 10 pixels.

At procedure 512, if the person $p_i$ and the package $q_j$ belong to one of the actions, the status of the action at the (t−1)-th frame is "drop-off," and the distance between the person and the package is greater than the threshold such as 10 pixels, the action recognition module 152 determines if the action is a rough handling and checks if the number of frames after the last "hold" frame equals to or is greater than a drop off threshold number in a range of 10-30. In certain embodiments, the drop off threshold number is 20.

In rare situation when the person $p_i$ and the package $q_j$ belong to one of the actions, the status of the action at the (t−1)-th frame is "drop-off," and the distance between the person and the package in the t-th frame equals to or is less than the distance threshold, the action recognition module 152 will ends the previous action at the (t−1)-th frame and starts a new action from the t-th frame. If the person $p_i$ and the package $q_j$ belong to one of the actions, and there are person or package interpolations, the action recognition module 152 will begin the process similarly from the earliest of the frame having the interpolation, and continues with the following frames until the t-th frame.

By the above procedures, the action recognition module 152 updates the available action or start a new action for the person $p_i$ and the package $q_j$ using the person tracking trajectory $f_i^t$ and the package tracking trajectory $g_j^t$ at the current frame. The procedures are repeated for all the k number of persons $P^t = \{p_1^t, \ldots, p_k^t\}$ and all the l' number of motion packages $Q^{t} = \{q_1^t, \ldots, q_{l'}^t\}$. The changes to the actions include updating certain actions, initializing new actions, and ending certain actions. The data now available includes the person trajectories, the package trajectories, the person and package distances in the frames, the actions $A^t = \{q_1^t, \ldots, q_{l'}^t\}$, and the ended actions at the t-th frame. The determination of whether the action is rough handling is described as follows.

Referring back to FIG. 7, at procedure 716, the action recognition module 152 determines whether an action at the t-th frame is a rough handling action. An action A of a person $p_i$ and a package $q_j$ is shown in FIG. 5D. The action starts from frame t−x, where the person $p_i$ picks up the package $q_j$; the person $p_i$ then holds the package $q_j$ for a while until frame t−1; at frame t, the person $p_i$ drops off the package $q_j$; and the action ends after certain number of frames after the last hold or after the drop-off. For example, FIG. 5D shows end of the action 20 frames after the last hold frame, the (t−1)-th frame. As the result, the action includes the (t−x)-th frame to the (t+19)-th frame. In certain embodiments, the determination of the rough handing may be performed at any drop off frames before the end frame t+19. Actually, the action may end before the frame t+19 if rough handing is observed before the frame t+19. In certain embodiments, the action recognition module 152 determines the rough handling based on multiple distances and speeds, and the distances and speeds are calculated starting from (t+2)-th frame, the third frame from the drop-off. The calculation includes the reference (or compared) package horizontal distance $d_h/d_{torso}$, the reference package vertical distance $d_v/d_{torso}$, the reference direct package distance $d_{pq}/d_{torso}$, the person-package pixel distance $d_{pq}$, the reference person-package distance $d_{pq}/d_{torso}$, the maximum speed, the average speed, and the acceleration a. Because we start calculating distance and speed from the (t+2)-th frame, the acceleration can only be calculated from the (t+3)-th frame. In certain embodiments, the action recognition module 152 determines a rough handling from the frame t+5, the distances, speeds, and acceleration at the (t+5)-th frame is calculated, and the criteria for a rough handling include: (1) at least one of $d_h/d_{torso}$ and $d_v/d_{torso}$ is greater than 1; (2) $1 \leq d_h/d_{torso} \leq 5$; (3) $d_{pq}$ is greater than 30 pixels; (4) $d_{pq}/d_{torso}$ is greater than 1; (5) $v_{max(t+5)}$ is greater than 0.1, or the package at the current frame has a high speed mark; and (6) $0.05 \leq a_{(t+5)} \leq 1$; (7) and the average speed at the current frame $v_{average(t+5)}$ is greater than 0.1. If the criteria are met, the action recognition module 152 ends the action and further calculates a rough handling score for the action; if the criteria are not met, the actions continues, and the action recognition module 152 will make a determination for the next frame, the (t+6)-th frame. If the action recognition module 152 determines for each of the frames (t+5) to (t+19) that there is no rough handling, the action is regarded as a normal action and will be discarded.

At procedure 718, after an action is determined to be a rough action, the action recognition module 152 may optionally calculate a rough handling score for the action, and sends the determined rough handling action and its rough handling score to the output module 154. In certain embodiments, the action recognition module 152 defines a high rough handing score of 3 and a light rough handling score of 1. The rough handling action is given the high rough handling score when at the (t+5)-th frame or at any frame following the (t+5)-th frame in the action: the accumulated distance >=3.0, or the average speed >=0.2, or the max speed >=0.3. Here the accumulated distance is the distance between the package in the current frame and the person's wrist keypoint in the last hold frame, the average speed is speed of the package in the last three frames (current frame and its two immediate previous frames), and the max speed is the greatest one at a frame from the (t+3)-th frame to the current frame. In certain embodiments, the action recognition module 152 defines a high rough handing score of 3, a medium rough handling score of 2, and a light rough handling score of 1. The rough handling action is given the high rough handling score when the accumulated distance >=3.0, or average speed >=0.2, or max speed >=0.3, is given a medium score when 3.0>accumulated distance >=1.5, 0.2>average speed >=0.15, and 0.3>max speed >=0.25, and is given a light handing score when the high or medium rough handling score requirements are not met.

At procedure 720, upon receiving the rough handling actions and their rough handling scores from the action recognition module 152, the output module 154 prepares a rough handling output, and sends the handling output to the displaying device 190. The rough handling output includes a video clip of the rough handling action, the trajectories of the person and the package (may be partial of the trajectories corresponding to the action) which include bounding box and keypoints of the person and the bounding box of the package at each position, and rough handling scores.

The displaying device 190, upon receiving the rough handling output from the output module 154, may display certain information from the output. For example, the displaying device 190 may display a rough handling video clip, display the bounding box of the person and the bounding box of the package at each frame, and display the rough handling score at the top of the video clip. The person keypoints, the distances, the speeds, and the acceleration may be part of the output, but are not displayed. A staff administrating the displaying device 190 may choose to access those hiding information when needed.

Variations to the above methods are available. For example, the method may change the sequence of certain steps, may use the detection module 146 to perform person and package detection instead of using the detection model service 170, may change the thresholds, may choose a human torso as reference from a different frame, may choose different number of frames for an action, may choose a different frame for starting distances and speeds calculation. In certain embodiments, the change of those parameters can be configure using the user interface 156.

In another aspect, the present disclosure relates to a non-transitory computer readable medium storing computer executable code. The code, when executed at a processer of a computing device, may perform the methods as described above. In certain embodiments, the non-transitory computer readable medium may include, but not limited to, any physical or virtual storage media. In certain embodiments, the non-transitory computer readable medium may be implemented as the storage device 136 of the computing device 130 as shown in FIG. 1.

In summary, certain embodiments of the present disclosure provide a rough handling recognition application, which has, among other things, the following advantages. (1) The system recognizes rough handling automatically, and saves cost for monitoring rough handling. (2) The system is robust in determination rough handling, and can be installed in different environments or scenes without complicated configuration. (3) The system can be implemented by installing local cameras, and connecting to one or a few cloud computing devices by networks. Therefore, there is almost no limitation to the computing power, and the implementation is simple yet novel, and is easily scalable. (4) The system can recognize rough handling actions in real time, which improves the efficiency of locating and correcting problems. (5) The BGS module, the detection module, and the detection model service can perform their function in parallel, and the analysis thus is fast. (6) The system uses frame difference to calculate backgrounds, and uses the backgrounds to remove stationary packages and adding high speed packages, which compensate the disadvantages of the detection model service. (7) The system uses interpolation technique for the person and package trajectories, which ensures accurate determination of the time for a pickup, hold, or drop-off status of an action. (8) The system combines different distances, speeds and acceleration to determine a rough handling, which removes noises and determines the rough handling accurately and robustly.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for detecting rough handling, comprising an imaging device and a computing device, the computing device comprising a processor and a storage device storing computer executable code, wherein the computer executable code, when executed at the processor, is configured to:
   receive a video stream comprising a plurality of video frames captured by the imaging device;
   obtain a plurality of person bounding boxes and a plurality of package bounding boxes from the plurality of video frames;
   construct a plurality of person trajectories and a plurality of package trajectories based on the obtained person bounding boxes and package bounding boxes;
   recognize an action between one of the plurality of person trajectories and one of the plurality of package trajectories, wherein the action comprises corresponding one person in the one of the plurality of person trajectories picks up, holds, and drops off corresponding one package in the one of the plurality of package trajectories; and
   determine existence of a rough handling when, at a predetermined frame after drop-off of the corresponding one package, a motion distance of the corresponding one package is greater than a threshold distance, and a motion speed of the corresponding one package is greater than a threshold speed.

2. The system of claim 1, wherein the computer executable code is configured to obtain the plurality of person bounding boxes and the plurality of package bounding boxes by, for each one of the plurality of video frames:
   detecting persons from the one of the video frames to obtain the plurality of person bounding boxes;
   detecting packages from the one of the video frames to obtain detected package bounding boxes; and
   deleting stationary package bounding boxes from the detected packages to obtain the plurality of package bounding boxes.

3. The system of claim 2, wherein the computer executable code is further configured to:
   calculate frame difference between the one of the video frames and its previous frame;
   define regions of the one of the video frames having high frame difference as foreground regions; and
   define the detected package bonding boxes having no overlap with the foreground regions as stationary package bounding boxes.

4. The system of claim 3, wherein the computer executable code is further configured to add an additional package bounding box to the obtained package bounding boxes, and wherein the additional package bounding box locates at one of the foreground regions when the one of the foreground region has no overlap with detected person bounding boxes and detected package bounding boxes.

5. The system of claim 1, wherein the computer executable code is configured to interpolate a person bounding box in one of the person trajectories when there is a missing position between two positions of the person trajectory, and interpolate a package bounding box in one of the package trajectories when there is a missing position between two positions of the package trajectory.

6. The system of claim 1, wherein the computer executable code is further configured to obtain person keypoints corresponding to each of the obtained plurality of person bounding boxes by detection.

7. The system of claim 6, wherein the person keypoints comprises a wrist keypoint, the corresponding one person picks up the corresponding one package when a closest distance between the wrist keypoints and the corresponding one of the package bounding box is less than 10 pixels, the corresponding one person holds the corresponding one package when the closest distance is less than 10 pixels after picks up, and the corresponding one person drops off the corresponding one package when the closest distance equals to or is greater than 10 pixels after holds.

8. The system of claim 7, wherein the threshold distance is a relative distance comparing to a pixel size $d_{torso}$ of the corresponding one of the person's torso.

9. The system of claim 8,
   wherein the corresponding one person picks up the corresponding one package at (t−u)-th frame, holds the corresponding one package from (t−u+1)-th frame to (t−1)-th frame, and drops off the corresponding one package at t-th frame;
   wherein the motion distance and the motion speed are calculated for each frame from the (t+x)-th frame until the motion distance is greater than the threshold distance and the motion speed is greater than the threshold speed;
   wherein for (t+y)-th frame, the motion distance is calculated by $d_{qq}/d_{torso}$, the motion speed is calculated by $$\frac{d_{(t-1)\ to\ (t+y)}}{(y+1) \times d_{torso}},$$

$d_{qq}$ is a pixel distance between bounding box center of the corresponding one package in the (t−1)-th frame and the (t+y)-th frame, $d_{(t-1)\ to\ (t+y)}$ is a pixel distance between bounding box center of the corresponding one package in the (t−1)-th frame and the (t+y)-th frame; and
   wherein the motion distance threshold is 1, the motion speed threshold is 0.1, t, u, x and y are positive integers, x is in a range of 1-4, and x≤y.

10. The system of claim 9, wherein x=2, and the computer executable code is configured to delete the action when y equals to 19.

11. A method for detecting rough handing, comprising:
   capturing, by an imaging device, a video stream comprising a plurality of video frames;
   obtaining, by a computing device, a plurality of person bounding boxes and a plurality of package bounding boxes from the plurality of video frames;
   constructing, by the computing device, a plurality of person trajectories and a plurality of package trajectories based on the obtained person bounding boxes and package bounding boxes;
   recognizing, by the computing device, an action between one of the plurality of person trajectories and one of the plurality of package trajectories, wherein the action comprises corresponding one person in the one of the plurality of person trajectories picks up, holds, and drops off corresponding one package in the one of the plurality of package trajectories; and determining, by the computing device, existence of a rough handling when, at a predetermined frame after drop-off of the corresponding one package, a motion distance of the corresponding one package is greater than a threshold distance, and a motion speed of the corresponding one package is greater than a threshold speed.

12. The method of claim 11, wherein the step of obtaining the plurality of person bounding boxes and the plurality of package bounding boxes comprises:
   detecting persons from the one of the video frames to obtain the plurality of person bounding boxes;
   detecting packages from the one of the video frames to obtain detected package bounding boxes; and
   deleting stationary package bounding boxes from the detected packages to obtain the plurality of package bounding boxes.

13. The method of claim 12, further comprising:
   calculating frame difference between the one of the video frames and its previous frame;
   defining regions of the one of the video frames having high frame difference as foreground regions; and
   defining the detected package bonding boxes having no overlap with the foreground regions as stationary package bounding boxes.

14. The method of claim 13, further comprising:
   adding an additional package bounding box to the obtained package bounding boxes,
   wherein the additional package bounding box locates at one of the foreground regions when the one of the foreground region has no overlap with detected person bounding boxes and detected package bounding boxes.

15. The method of claim 11, further comprising obtaining person keypoints corresponding to each of the obtained plurality of person bounding boxes.

16. The method of claim 15, wherein the person keypoints comprises a wrist keypoint, the corresponding one person picks up the corresponding one package when a closest distance between the wrist keypoints and the corresponding one of the package bounding box is less than 10 pixels, the corresponding one person holds the corresponding one package when the closest distance is less than 10 pixels after picks up, and the corresponding one person drops off the corresponding one package when the closest distance equals to or is greater than 10 pixels after holds.

17. The method of claim 16, wherein the threshold distance is a relative distance comparing to a pixel size $d_{torso}$ of the corresponding one of the person's torso.

18. The method of claim 17,
   wherein the corresponding one person picks up the corresponding one package at (t−u)-th frame, holds the corresponding one package from (t−u+1)-th frame to (t−1)-th frame, and drops off the corresponding one package at t-th frame;
   wherein the motion distance and the motion speed are calculated for each frame from the (t+x)-th frame until the motion distance is greater than the threshold distance and the motion speed is greater than the threshold speed;
   wherein for (t+y)-th frame, the motion distance is calculated by $d_{qq}/d_{torso}$, the motion speed is calculated by $$\frac{d_{(t-1)\ to\ (t+y)}}{(y+1) \times d_{torso}},$$

$d_{qq}$ is a pixel distance between bounding box center of the corresponding one package in the (t−1)-th frame and the (t+y)-th frame, $d_{(t-1)\ to\ (t+y)}$ is a pixel distance between bounding box center of the corresponding one package in the (t−1)-th frame and the (t+y)-th frame; and
   wherein the motion distance threshold is 1, the motion speed threshold is 0.1, t, u, v, x and y are positive integers, x is in a range of 1-4, and x≤y.

19. The method of claim 18, wherein x=2, and the method further comprises deleting the action when y equals to 19.

20. A non-transitory computer readable medium storing computer executable code, wherein the computer executable code, when executed at a processor of a computing device, is configured to:
   receive a video stream comprising a plurality of video frames captured by an imaging device;
   obtain a plurality of person bounding boxes and a plurality of package bounding boxes from the plurality of video frames;
   construct a plurality of person trajectories and a plurality of package trajectories based on the obtained person bounding boxes and package bounding boxes;
   recognize an action between one of the plurality of person trajectories and one of the plurality of package trajectories, wherein the action comprises corresponding one person in the one of the plurality of person trajectories picks up, holds, and drops off corresponding one package in the one of the plurality of package trajectories; and
   determine existence of a rough handling when, at a predetermined frame after drop-off of the corresponding one package, a motion distance of the corresponding one package is greater than a threshold distance, and a motion speed of the corresponding one package is greater than a threshold speed.

* * * * *